(12) United States Patent
Donahue et al.

(10) Patent No.: US 8,812,627 B2
(45) Date of Patent: Aug. 19, 2014

(54) SYSTEM AND METHOD FOR INSTALLATION AND MANAGEMENT OF CLOUD-INDEPENDENT MULTI-TENANT APPLICATIONS

(75) Inventors: James E. Donahue, Sunnyvale, CA (US); Ricky Ho, San Jose, CA (US); Sudarsun Kannan, Atlanta, GA (US); Pradnyesh S. Gore, Atlanta, GA (US)

(73) Assignee: Adobe Systems Incorporated, San Jose, CA (US)

( * ) Notice: Subject to any disclaimer, the term of this patent is extended or adjusted under 35 U.S.C. 154(b) by 681 days.

(21) Appl. No.: 12/955,459

(22) Filed: Nov. 29, 2010

(65) Prior Publication Data
US 2012/0047239 A1 Feb. 23, 2012

Related U.S. Application Data

(60) Provisional application No. 61/375,650, filed on Aug. 20, 2010.

(51) Int. Cl.
*G06F 15/177* (2006.01)
*G06F 9/50* (2006.01)
*G06F 15/173* (2006.01)

(52) U.S. Cl.
CPC .................................. *G06F 9/5072* (2013.01)
USPC ........................................ 709/220; 709/226

(58) Field of Classification Search
CPC . G06F 11/10; G06F 11/1076; G06F 11/1092; G06F 17/30194; G06F 8/71; G06F 2211/104; G06F 3/06

USPC ........................................ 709/220, 226; 718/1
See application file for complete search history.

(56) References Cited

U.S. PATENT DOCUMENTS

| | | | |
|---|---|---|---|
| 2002/0104067 A1* | 8/2002 | Green et al. | 717/101 |
| 2009/0300149 A1 | 12/2009 | Ferris et al. | |
| 2010/0042720 A1* | 2/2010 | Stienhans et al. | 709/226 |
| 2010/0057890 A1* | 3/2010 | DeHaan | 709/220 |
| 2010/0088150 A1* | 4/2010 | Mazhar et al. | 705/10 |
| 2010/0131948 A1 | 5/2010 | Ferris | |
| 2010/0306765 A1 | 12/2010 | Dehaan | |
| 2010/0306767 A1* | 12/2010 | Dehaan | 718/1 |
| 2011/0213884 A1* | 9/2011 | Ferris et al. | 709/226 |

* cited by examiner

*Primary Examiner* — Hee Soo Kim
(74) *Attorney, Agent, or Firm* — Wolfe-SBMC

(57) ABSTRACT

An application framework may include a cloud-independent application manager, a cloud-independent content services manager, and cloud-independent content services servers. The framework may dynamically install and manage scalable, multi-tenant applications in a cloud, and may scale the applications, as needed. The application manager may receive and handle requests to install application domains and configurations thereof, and may receive and respond to requests for information about servers on which installed methods are available. The content services servers may execute installed methods, using underlying resources of the cloud, through a cloud-specific SPI. The content services manager and application manager may work together using shared cloud storage to provide scalable content services at a very large scale. In the context of the framework described herein, an "application" may be defined by methods bundled into configurations, and by various cost-based and/or performance-based rules that specify how server instances providing those methods are to be managed.

20 Claims, 13 Drawing Sheets

SYSTEM AND METHOD FOR INSTALLATION AND MANAGEMENT OF CLOUD-INDEPENDENT MULTI-TENANT APPLICATIONS

PRIORITY INFORMATION

This application claims benefit of priority of U.S. Provisional Application Ser. No. 61/375,650 entitled "System and Method for Installation and Management of Cloud-Independent Multi-Tenant Applications" filed Aug. 20, 2010, the content of which is incorporated by reference herein in its entirety.

BACKGROUND

Description of the Related Art

The computing, information, and communication industries are undergoing a massive transition with the rise of low-cost, high-performance devices, high-bandwidth communication infrastructure, and the Internet. The personal computer (PC), once a stalwart of information technology, is in rapid retreat, its value being drained away by innumerable large and small players offering solutions to problems that overlap the offerings of the PC and often extend well beyond them. Unfortunately, although users have been offered a dramatically wider array of options than before, it has come at a very real cost: data and applications are fragmented across heterogeneous and often incompatible devices and the Internet, device management has become extraordinarily complicated, and devices and Internet services come and go at an astonishing rate. Chores that were complicated for some users, even when they had just one PC to manage, have become significantly more difficult.

Cloud computing promises to alleviate these issues by restructuring the way that users engage with their information. With cloud computing, instead of installing and maintaining applications on every device in order to interact with data that may be spread across one or more of those devices, data is encapsulated in applications that are hosted as services on servers and delivered from those servers to the devices as clients. Typically, cloud computing services in the "public cloud" are hosted on the Internet, managed and maintained by third-party providers. The equivocation between data and applications in cloud computing mitigates the heterogeneity problem by using Internet communication and protocol standards, which can be supported on almost all connected devices, to provide services at any time and any place. It also mitigates the sustainability and maintainability problems by allowing its services to be amended, upgraded, and augmented by the service provider with minimal demands on the client.

In contrast to enterprise-scale applications, which may employ clusters of servers (e.g., tens of severs for a single application) and hundreds of terabytes of storage for the use of a managed number of users (e.g., up to several hundreds of thousands), a cloud scale application may employ server farms (e.g., thousands of servers for a single application) and tens to hundreds of petabytes of storage for an unmanaged number of users (e.g., tens of millions or more). Conventional cloud computing solutions typically manage scaling using distributed, rather than centralized, resources, since it is usually not possible to make resources big enough to support an application in cloud scale. In addition, in a typical cloud computing approach, an application must be broken down into fixed-sized components. Cloud computing services must somehow allow for dynamic use models, as demand grows and shrinks In addition, in such large systems, it is almost always true that "something just broke" impacts the system's ability to provide consistency. Furthermore, it may be impractical, if not impossible, for application code and large amounts of data to be reside in proximity within a given cloud, but crossing cloud boundaries can be very expensive.

SUMMARY

Various embodiments of systems and methods for installing and managing scalable, cloud-independent, multi-tenant applications are described herein. In some embodiments, the system may include one or more cloud-independent application framework instances, each of which includes several tightly interconnected components. For example, each cloud-independent application framework instance may include a cloud-independent application management component, a cloud-independent content services management component, and one or more content services provider components. The cloud-independent application framework may provide mechanisms for dynamically installing and managing multiple cloud-based applications in a cloud-independent fashion, and for scaling them as needed.

In some embodiments, the application manager component of an application framework may receive and handle requests to install application domains and configurations thereof, and may receive and respond to requests from a client for information about servers on which various methods/services are available. As described in more detail herein, an application may be defined by a set of methods that are bundled together into one or more application configurations and by rules for managing those application configurations. The application configurations for a given application may be managed within an application domain in a cloud computing environment by an instance of the application framework. The content services servers of the application framework may be configured to execute an installed application's methods. The content services manager component of the application framework may be used by the application manager to help manage installations and handle lookup requests. In various embodiments, the content services manager and the cloud-independent application manager may be configured to work together using shared storage in order to provide scalable content services at a very large scale (e.g., Web scale).

The application framework components described herein may provide a framework for efficiently building large systems. For example, using this framework, an application developer may first cloud-independent methods and/or services, may compose an application by defining one or more configurations (each specifying a collection of one or more of the methods/services), and may define rules that specify how many instances should be launched (and when) to maintain sufficient throughput and/or a reasonable cost. In the context of the cloud-independent, application management framework described herein, an "application" may be defined by a set of method definitions that are bundled together into one or more configurations, and one or more rule bases that specify how server instances running these configurations are to be managed in a cloud computing environment.

In some embodiments, an application manager that is executing in a cloud computing environment may receive a request to register an application domain in the cloud computing environment. The request may include domain configuration information and a domain rule base. In response to receiving the request, the application manager may store the domain rule base in the cloud computing environment, launch a content services manager in the cloud computing environment, and pass the domain configuration information to the content services manager. The content services manager may then store the domain configuration information in the cloud computing environment. In some embodiments, the domain configuration information and the domain rule base may be subsequently used in managing one or more application configurations registered in the application domain. In some embodiments, when registering a new application domain, the application manager may obtain a partition in storage of the cloud computing environment for the use of the application domain and/or any configurations thereof. For example, the domain rule base, the domain configuration, and any application configurations and/or configuration-specific rule bases that are subsequently received for the application domain may be stored in a partition identified by an application domain ID. A storage partition allocated for and/or assigned to a particular application domain may also provide operation storage for the methods and services installed in various configurations in the application domain, in some embodiments.

In some embodiments, an application manager that is executing in a cloud computing environment may receive a request to register an application configuration in the cloud computing environment. The request may include one or more cloud-independent methods composed in an application configuration object, and an identifier of an application domain that is defined and installed in the cloud computing environment. In response, the application manager may pass the application configuration object to a cloud-independent content services manager executing in the cloud computing environment, which may store a mapping of the methods to the application domain. In some embodiments, the application manager may receive a request for a listing of methods or services available in the application domain, and in response may return a listing of the methods or services available in the application domain and an indication of one or more content services servers on which each of the methods or services available in the application domain can be invoked. In some embodiments, the application manager may receive, from a client, a request for information indicating a content services server executing in the cloud computing environment on which a given one of the methods can be invoked, and in response may return, to the client, endpoint information identifying a content services server on which the given method can be invoked.

In some embodiments, a client may send a request to a content services server to invoke a given method or service that is available on the content services server. In response, the content services server may execute the given method or service on behalf of the client. In some embodiments, in order to execute the given method or service, the content services server may access one or more resources of the cloud computing environment through a cloud-specific service provider interface that is coupled to the cloud-independent components executing in the application domain.

In some embodiments, the application manager may (upon installing the application configuration, in response to a request to invoke one of the methods, or in response to receiving a request for endpoint information for a content services server on which one of the methods can be invoked) start a cloud-independent content services server instance in the cloud computing environment, and configure the cloud-independent content services server instance to execute one or more of the methods, dependent on the contents of the application configuration object.

In some embodiments, a domain rule base or configuration-specific rule base may include rules for the application manager to apply in managing content services server instances. For example, such rule bases may specify conditions (e.g., based on collected performance and/or cost metrics) and corresponding actions to take to scale an application in response to changing conditions (e.g., by starting and/or stopping content services server instances). In some embodiments, performance and/or cost metrics may be obtained by probing the content services servers that are executing in the application framework (e.g., periodically, or in response to a request from a client).

Figure 1:
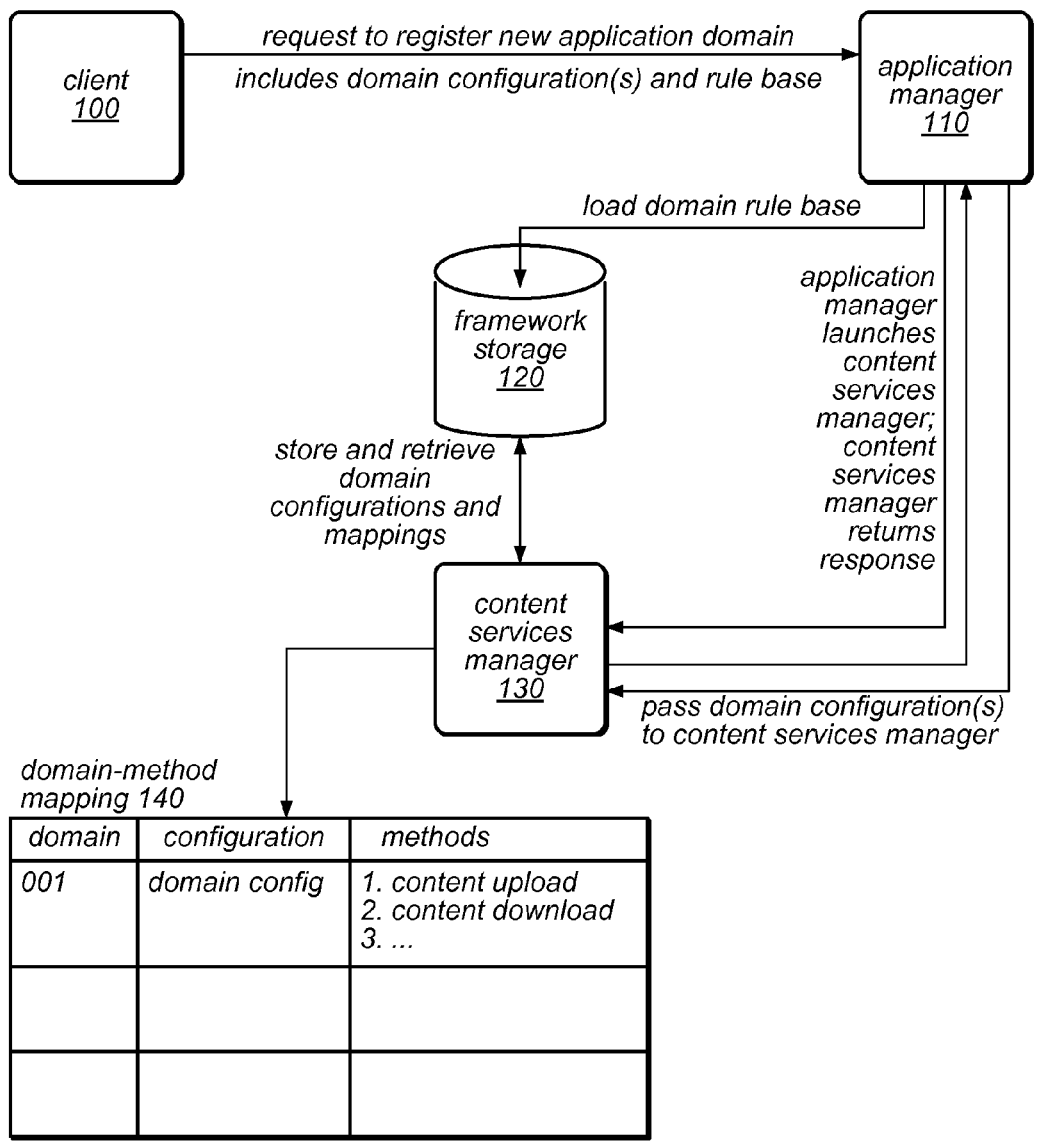
FIG. 1 is a block diagram illustrating various components of a cloud-independent application management framework and their use in registering an application domain, according to some embodiments.

While various embodiments are described herein by way of example for several embodiments and illustrative drawings, those skilled in the art will recognize that embodiments are not limited to the embodiments or drawings described. It should be understood, that the drawings and detailed description thereto are not intended to limit the embodiments to the particular form disclosed, but on the contrary, the intention is to cover all modifications, equivalents and alternatives falling within the spirit and scope of the disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of systems and methods for installing and managing scalable, cloud-independent, multi-tenant applications are described in more detail below. In some embodiments, the system may include one or more cloud-independent application framework instances, each of which includes several tightly interconnected components. For example, each cloud-independent application framework instance may include a cloud-independent application management component (sometimes referred to herein as a "scalable application manager", or merely an "application manager"), a cloud-independent content services management component (sometimes referred to herein as a "content services manager"), and one or more content services provider components (sometimes referred to herein as "content services servers"). As described herein, in some embodiments, the cloud-independent application framework may provide mechanisms for dynamically installing and managing multiple cloud-based applications in a cloud-independent fashion, and for scaling them as needed.

In some embodiments, a single cloud-independent application framework instance may be configured to manage multiple applications (e.g., each within its own application domain in the cloud computing environment in which it is executing), and the content services manager may be used to keep track of them (e.g., to keep track of the mappings between applications and the content services servers on which they run, and/or other configuration information for the applications managed within the framework). In general, the application manager component of such an application framework may be thought of as a client-facing component of the framework configured to receive and handle requests to install application domains and configurations thereof, and to receive and respond to requests from a client for information about servers on which various methods/services are available (e.g., endpoint information). The content services servers of the application framework may be thought of as the "worker" servers that are configured to execute an installed application's methods. The content services manager component of the application framework may be thought of as a dedicated server used by the application manager to help manage installations and handle lookup requests. In various embodiments, the content services manager and the cloud-independent application manager may be configured to work together using shared storage in order to provide scalable content services at a very large scale (e.g., Web scale).

The application framework components described herein may provide a framework for efficiently building large systems. For example, using this framework, an application developer (e.g., a web service developer) may first build atomic units (e.g., one or more cloud-independent methods and/or services), may compose an application by defining one or more configurations for the application (each specifying a collection of one or more methods that are to be invoked synchronously, asynchronously, and/or through triggers), and may provide mechanisms for scaling the application by defining one or more rule bases for the application (e.g., a set of rules that specify how many, or when, instances should be launched to maintain sufficient throughput and/or a reasonable cost).

In some embodiments, the framework components described herein may leverage the storage of a cloud computing environment (e.g., storage provided by a cloud computing services vendor) as the shared storage through which they are integrated. In some embodiments, the framework itself may operate on the basis of an "eventual consistency" model. For example, in a system with strong consistency guarantees, after an update completes, all accesses return new values. However, achieving strong consistency is very expensive at a large scale. Conversely, in systems with weak consistency guarantees, after an update completes, there may be an "inconsistency window" during which accesses may return either the new value or the old value. In a system operating under an eventual consistency model, the inconsistency window may be bounded. In some embodiments, by accepting the possibility of inconsistency in some cases, the system may, in the general case, exhibit acceptable performance without incurring the higher costs of a strong consistency model.

In some embodiments, cloud-based applications may be made highly portable and scalable by building them out of atomic components (e.g., small, independent pieces) that are loosely coupled. Using this approach, it may always be possible to leverage more threads in order to scale the applicable up, if needed. In some embodiments, the cloud-based applications may be invoked asynchronously (e.g., on an as-needed basis). For example, any operation without a tight time bound may be queued, and the system may always be able to start more threads to handle an increasing workload (e.g., an increased demand for services).

In the context of the scalable, cloud-independent, application management framework described herein, an "application" may be defined by: a set of method definitions that are bundled together into one or more configurations, and one or more rule bases that specify how server instances running these configurations are to be managed in a cloud computing environment (e.g., rules that may be evaluated to determine how and/or when to launch or stop instances of content services servers that provide the bundled methods). Applying this simple definition for applications may make it easy for the components of the framework to manage multiple applications in a single cloud computing environment.

Note that in some embodiments, applications may be written using semantics that are common across the application framework. For example, each application managed by such a framework (e.g., a framework instance) may conform to software development kit (SDK) definition for the framework. In such embodiments, in order to add new methods on the server, they may need to be written using a common set of interfaces, e.g., a method definition interface. While the methods (and/or applications) may need to be written using common interface(s), they may, in general, implement any arbitrary functionality, as long as the interface standards are followed. In some embodiments, a developer may create an application by writing methods in the Java™ programming language and using this generic method interface. Thus, the methods may be cloud-independent. In some embodiments, an application (or one of its methods) may include calls to external services, such as services provided by a cloud computing services vendor. For example, an application (or method thereof) may call a method of the LiveCycle™ encryption service from Adobe Systems Incorporated. In such embodiments, the application developer may have to determine out how to access that service from within an otherwise cloud-independent application (or method). Other external services that may be called by cloud-independent applications (or methods thereof) may be more generic and/or may be cloud-independent themselves.

The application management framework described herein may in some embodiments provide dynamic configuration mechanisms for managing scalable applications in a cloud computing environment. Using these mechanisms, various components of the framework may be started and stopped (e.g., in response to increasing or decreasing demand) and/or they may be moved to different locations (e.g., due to availability or health of various hardware components, rebooting or restarting of hardware components, etc.) In some embodiments, uniformity of components may simplify their management, but may or may not be a requirement. In one embodiment, one or more of the management components of the framework (e.g., the content services manager or application manager) may consult a database of configurations and/or rules to decide how to manage the other components.

Realistically, within a cloud computing environment there are no resources with truly unlimited capacity. However, rather than ignoring the constraints of the environment (since every box has a limit on the number of cycles and the amount of memory it can provide), the components of the application framework described herein may embrace them. For example, the framework may be configured to support (and in some cases expose) data partitioning of the underlying databases of a cloud computing environment. In another example, the framework may be configured to add more servers for a given application, if more threads are needed. The application management component may in some embodiments allow an application to be scaled as needed, e.g., by adding (i.e. starting) new servers or server instances, and/or by drop (i.e. stopping) servers or server instances. In some embodiments, the application management component may be configured to manage server instances across multiple clouds (e.g., across multiple cloud computing environments). In some embodiments, the application management component may provide rule-based automatic scaling and healing. For example, the application management component may monitor performance, cost, or other metrics while an application is running, and may detect conditions that require a change in the number and/or configuration of one or more content services servers. The application management component may implement actions that cause the system to react to or recover from the detected conditions. In some embodiments, the application management component may manage applications at an extreme level of elasticity (e.g., allowing them to grow and/or shrink on a large scale). For example, the application management component may implement hierarchical layers of content services managers and/or may implement metrics aggregation. The application management component may in various embodiments include a cost aware scheduler to facilitate operational efficiency, and may use the storage provided by the underlying cloud computing environment for robustness.

In some embodiments, the content services management component may implement a content management system for web scale (i.e. content management at a very large scale). For example, in various embodiments, a content services manager may manage basic storage and metadata for multiple configurations in an application domain, and may provide advanced content services, such as asynchronous (queued) method invocation, or cascaded content triggers. As previously noted, a common storage layer (provided, for example, by the underlying storage of the cloud computing environment) may be used as an infrastructure to facilitate the coordination between the scalable application management component, the content services manager, and one or more content services servers, and that storage layer (and other resources of the underlying cloud computing environment) may be accessed by the cloud-independent components of the framework through a service provider interface (SPI)

between the framework and the particular cloud on which it is installed. In other words, the service provider interface may in some embodiments facilitate interaction between the cloud-independent components of the application framework and various resources of the particular cloud on which it runs, e.g., storage resources, database services, queuing services, computing resources, etc. In some embodiments, an application framework instance may include two or more different SPI implementations to be used connect the cloud-independent component of the framework to the underlying resources of different cloud computing environments.

Note that in some embodiments, any number of different applications may share a common structure and may be managed in similar ways within an instance of the application framework described herein. In some embodiments, the application configurations installed in the framework may be designed for multi-tenancy. As used herein, the term multi-tenancy (or multi-tenant) may refer to the framework's ability to be able to simultaneously handle many different applications, and to keep them from interfering with each another. In some such embodiments, each application managed by an instance of the application framework may have an application domain with a different application domain identifier (sometimes referred to herein as an "application domain ID", or merely an "application ID"), and a content services manager within the framework instance may keep track of these applications, application domains, and corresponding application IDs. In some embodiments, there may be one or more configurations for each application within an application domain, and a rule base for each application domain and/or configuration thereof. In some embodiments, for each application domain, there may be one domain configuration, e.g., to make sure that all the servers in the application domain share some common characteristics (such as the way they do authentication). In other words, the domain configuration may apply to multiple application configurations to ensure consistent behavior within the application domain for common tasks or utilities. In some embodiments, other configurations (e.g., configurations that are composed of different combinations of methods and/or services) may be layered on top of the domain configuration for a given application.

As noted above, an application to be managed within an instance of the application framework described herein may be built up out of three types of components: atomic units (e.g., individual methods and/or services that can be invoked and/or requested by a client), one or more configurations (where a configuration is an application component that defines the application in terms of a collection of the methods and/or services that a client may wish to use), and one or more rule bases (e.g., an application domain rule base and/or a rule base for each application configuration). In some embodiments, the contents of a configuration object may include the collection of code for the methods and services of a particular configuration (e.g., a jar file that includes all of the code to be dynamically loaded and/or installed for the application configuration), and metadata that describes what is in the code (e.g., the methods, services, authenticators, etc. contained in the code). As previously noted, various methods included in the applications managed by the framework may be synchronous, asynchronous, or "triggered" methods. Therefore, in some embodiments, the configuration object may include the definitions of methods that can be invoked synchronously (e.g., by HTTP clients), methods that can be invoked asynchronously (along with their associated input queues), background service threads (e.g., for garbage collection or other background processes), and/or external methods that can be invoked by the application, such as the authentication mechanisms of the LiveCycle™ encryption software SPI described above. In some embodiments, the system may support asynchronous invocation cleanup and recovery of all parts of the framework infrastructure, according to the methods and/or rules of the configurations installed therein.

In some embodiments, each configuration may be stored as an object in the shared storage layer (e.g., in the storage provided by the underlying cloud computing environment). After an application domain has been defined within a framework instance, the application manager (which may be thought of as an administrative client of the framework) may register additional configurations that may be independently loaded onto particular content services servers started on behalf of the application. The loading of these configurations and the number of machines that happen to have these configurations installed at any given time may be determined by the application manager, according to the rules in the domain rule base (i.e. the rule base that was supplied when the application domain was defined) and/or a rule base for a particular configuration of the application. As previously noted, a rule base may include rules that govern when one or more content services servers are started or stopped in order to handle requests for the methods of a given application.

In various embodiments, a rule base for an application domain or configuration thereof (e.g., one provided to the application manager by an application developer) may include rules of different types. For example, in some embodiments, each rule base may include rules of one or more of the following types:

Rules specifying conditions that the application manager can understand and evaluate itself. For example, these conditions may be in a format that the application manager can evaluate using its own static methods. An example of such a condition is a condition that evaluates whether the maximum number of free CPUS on any given server machine is less than four, as follows:

$$\text{maximum("serverconfig\_serveridX\_noOfFreeCPUS")} < 4$$

Rules specifying conditions that the application manager cannot understand. In some embodiments, the application manager may depend on the content services management component to evaluate these conditions and to return a result of the evaluation.

In some embodiments, the conditions in the rule base may specify a preloaded archive file name, the class name, and the method names to which they apply. For example, in some embodiments that are based on the Java™ programming language, the archive may be a Java™ archive (JAR) file associated with the initial configuration provided for the application domain. In some embodiments, additional parameters may be needed for constructing the object instance (e.g., for configuring an instance of a content services server to provide the methods of the configuration) or for invoking specific methods of the configuration. Therefore, a dynamic loader implementation may be used to provide different kinds of condition checking for different application domains. In some embodiments, a developer may upload additional files that contain methods to evaluate configuration-specific conditions and return the Boolean value of that condition. For example, the developer may upload files (e.g., through a client) specifying conditions that cannot be evaluated by the application manager, such as conditions that must be evaluated by the content services server. The content services server may then return the Boolean value of the condition to the application manager.

As previously noted, the content services manager may maintain a mapping for each application domain identifying the configurations, methods, services and/or rule bases that have been registered and/or installed for that application domain. In some embodiments, the domain configuration information and/or the mappings may be stored in a particular partition of the framework storage dedicated for the use of a single application domain and its configurations. In some embodiments, methods for evaluating conditions specified in one or more rule bases may query the application manager and/or the content services manager for the list of content services server instances in an application domain (e.g., if this list of instances is needed to collect configuration-specific information), and then may query those content services servers to obtain the information needed to evaluate the conditions specified in the rule bases. In some embodiments, the additional methods for evaluating various conditions (e.g., cost, performance, or other metrics that characterize the application configurations that are installed and executing on the content services servers in the application domain) may not be limited to archive type files but may include other types of code files (e.g., files containing code in other object-oriented programming languages).

In some embodiments, the method mapping maintained by the content services manager for an application domain may allow a client to connect to an appropriately configured content services server, even if such a server does not currently exist when a client request is received. For example, a client may use the application manager to obtain an endpoint of a server that is configured to provide a specified method of a particular application domain when it invokes the method. However, if the client requests an endpoint for a server that is configured to provide a specified method, but such a server configuration that is not yet running, the application manager may start and configure a new content services server instance before replying to the client, and then may return endpoint information for the newly launched and configured content services server instance to the client. As previously noted, in some embodiments, the application manager may have launched a content services manager, as described herein.

In some embodiments, this content services management component may work alongside the application management component to perform various configuration-related functions, while the application management component may provide more general application management functionality.

In some embodiments, a cloud-independent application framework implementation may include a schema-less, non-relational database (i.e. a "cloud friendly" database) for the use of an application and/or its methods. In some embodiments, such a database may incorporate various multi-valued attributes required to manage content on behalf of an application (e.g., as specified in one or more applicable rule bases). In some embodiments, there may be no underlying file system in the storage allocated for or assigned to a particular application domain. Instead, the system may assume simpler "blob storage" semantics (which may or may not include update or append operations). In some embodiments, the system may not support transactions or shared state. In such embodiments, underlying storage mechanism may be predicated on "shared nothing eventual consistency" and/or there may be limited synchronization based on optimistic concurrency control and/or advisory locking In some embodiments, the system may implement stream-based method invocation. In such embodiments, methods may take streams as arguments, and may return streams as results. Streams may also be used to return query results as well as perform bulk transfers, in some embodiments.

As previously noted, storage employed by an application framework (or an instance thereof) may be partitioned by application domain (e.g., according to the registered application domain identifiers), and the methods and services of an application domain may have access to data in the partition associated with the corresponding domain ID (e.g., data stored in the operation storage for the application domain). For example, separate tables (or other types of data structures) or databases for storing configuration information, mappings, and/or operating data for various application configurations may be created for each application domain. In some embodiments, such partitioning may take advantage of the organization of the underlying storage system (i.e. the storage system provided by a third-party cloud computing service or cloud storage service for the cloud computing environment in which the framework is installed).

In some embodiments, when a new application domain is installed, everything in its domain may be associated with the application domain ID provided at its installation, including the portion of the framework storage in which the application configuration, rule base information, and any data for the application is stored (e.g., the operating storage for the application). In some ways, a framework instance itself (which may manage multiple application configurations for each of multiple application domains) may be thought of as a special application with its own hardwired application ID. For example, at the storage level, the framework instance may be managed in the same way as other applications, in that its storage may be maintained in a partition identified by its application domain ID.

In some embodiments, a typical use model for the cloud-independent application framework described herein may be to begin by installing an application manager for a new application domain in a cloud computing environment. That application manager may then be used to load application configurations and/or to launch them on one or more content services servers (e.g., to instantiate them, configure them, and start them running) In some embodiments, the application manager may be a generic content services server instance that implements an application manager interface (AMI) usable for loading applications and starting them running In some embodiments, a client may request (e.g., through such an AMI) that the application manager install one or more other configurations on itself (i.e. in its domain). In this "proto-server" model, one of the content services servers may essentially use a service running on the server to configure itself. In other words, in order for a content services server or an application manager to be able to configure a server, an initial content services server instance may include one or more built-in "proto-server" methods, such as methods to upload a new configuration (e.g., its code and metadata), search existing configurations, and/or install an existing configuration on one or more content services servers. In some such embodiments, metadata may be passed to the initial content services server describing other methods to be installed, background services to be installed and started, etc., and one or more of the proto-server methods may be invoked in order to install and/or start the described methods and services. In this way, the server may be used to configure itself In other words, some of the proto-server methods that may be provided by the initial content services server may be methods that the configuration says the server should install on itself. For example, a configuration loaded on the initial content services server may specify that the initial content services server should "install an application manager on yourself" and/or "install a content services manager on yourself".

As previously noted, each application managed by an instance of the application framework described herein may be associated with a different application domain identifier (i.e. an application domain ID), which may in some embodiments be represented as a 128-bit GUID ("universal ID"), or a random string. To register an application with the application framework, a client application may send a request to register a new application domain to the application manager on behalf of an application developer. Once the application domain has been registered and installed in the framework, one or more subsequent requests may to sent from a client to the application manager to request installation of one or more application configurations for the application domain. A request register a new application domain may in some embodiments include one or more of the following:

A new application domain ID,
  A domain configuration for the new application, i.e. a configuration that may be installed on a content services server for the application and/or on each content services server instance that runs as part of the application, and
  A domain rule base to be used by the application manager to manage the collection of content services server instances that are later launched and configured to provide the methods of various application configurations.

In other words, in order to register a new application (with a new application ID), a client may send image information (e.g., code to provide the methods and/or utilities of the domain configuration) and various parameters (e.g., configuration information and/or other metadata) to the application manager. In some embodiments, the parameters provided in the request may enable registering the application domain with the application manager and may provide information that would enable the application manager to launch the intended content services servers. For example, the information may include the location and/or identifier of the image (code) to be installed and/or the initial number of content services server instances to be launched. Additional parameters provided with a registration request may include those that are needed to build a web service (e.g., parameters needed to deploy and/or host a web application) on one or more content services servers in the cloud computing environment. As described above, the request may also include a rule base that includes various conditions for the application manager to evaluate and corresponding actions to be taken in response to the evaluation.

In some embodiments, a request to register new application domain may be sent directly to the application manager from a framework client (e.g., on behalf of an application developer) in a format that is readable by the application manager. For example, in some embodiments, the request may be sent as a text file in a specific format. In other embodiments, the application manager may be configured to accept requests in other formats, to extract information from them, to use the information in the file to install a new application, and/or to forward some or all of the information extracted from the file to other components of the framework (e.g., the content services manager).

FIG. 1 is a block diagram illustrating various components of the cloud-independent application framework described herein, and the use of these components in registering and/or installing an application domain in a cloud computing environment, according to one embodiment. As shown in this example, a client 100 may send a request to register a new application domain to an application manager instance 110 executing in the cloud computing environment. For example, an application developer or application provider may access application manager 110 through a client 100 to install a new application domain in the cloud computing environment. As illustrated in FIG. 1, the request may include configuration information for the application domain, i.e. a domain configuration, and a rule base for the application domain. As described above, the domain configuration may in some embodiments include code and a configuration object that describes methods, services, and/or authenticators contained in the code. In some embodiments, a single domain configuration and a single application domain rule base may be provided for a given application domain. In other embodiments, two or more domain configurations and/or domain rule bases may be provided for a given application domain. For example, two or more domain configurations and/or domain rule bases may be provided for a given application domain during its registration, or an initial domain configuration and domain rule base may be provided during registration, with any additional domain configurations and/or domain rule bases being provided at a later time.

In response to receiving the registration request, the application manager 110 may load the domain rule base that was included in the domain configuration into framework storage 120. As described herein, in some embodiments, framework storage 120 may also be located in the cloud computing environment in which the framework is executing. In some embodiments, in response to the application manager 110 initiating the loading of the domain rule base for the application domain, a partition within framework storage 120 may be allocated for and/or assigned to the new application domain. For example, in some embodiments, as part of registering and installing a new application domain, the application manager may request and obtain an allocation of storage from the cloud computing environment for the use of the new application domain, or the application manager may assign to the new application domain a partition within storage that was previously allocated to the framework by the cloud computing environment.

In some embodiments, in response to receiving the request to register a new application domain, the application manager 110 may launch a content services manager 130, and application manager 110 may pass one or more domain configurations to content services manager 130 for installation. For example, content services manager 130 may install the methods, services, and/or authenticators of the domain configuration(s) in response to receiving the domain configuration(s) from application manager 110, and may be subsequently used in installing additional methods in the application domain. In other embodiments, application manager 110 may launch content services manager 130 when application manager is installed in the cloud computing environment, or at another time, independent of any request to register a new application domain. As described herein, content services manager 130 may be configured to maintain the mappings between methods and their application domains. In some embodiments, content services manager 130 may return a response to application manager 110 indicating the successful launching of content services manager 130 for the new application domain (e.g., by returning the application domain ID assigned to the new application domain), and/or or may provide the initial mappings for the application domain to application manager 110 as part of the registration/installation process.

One example of a mapping maintained by content services manager 130 is shown in FIG. 1 as domain-method mapping 140. In this example, domain-method mapping 140 includes mappings for a single configuration of an application domain (i.e. an application domain with an application ID of "001"). The configuration is a domain configuration having three or more methods, including a "content upload" method, a "content download" method, and at least one other method (whose name is not illustrated in FIG. 1). In some embodiments, domain-method mapping 140 is stored (and subsequently kept up to date) in framework storage 120 by content services manager 130 (e.g., in a partition allocated for or assigned to the new application domain). As described in more detail herein, the mappings maintained by content services manager 130 may be accessed as needed in order to manage the new application and/or instances of content services servers that are subsequently launched and configured to provide various methods of the new application.

Figure 2:
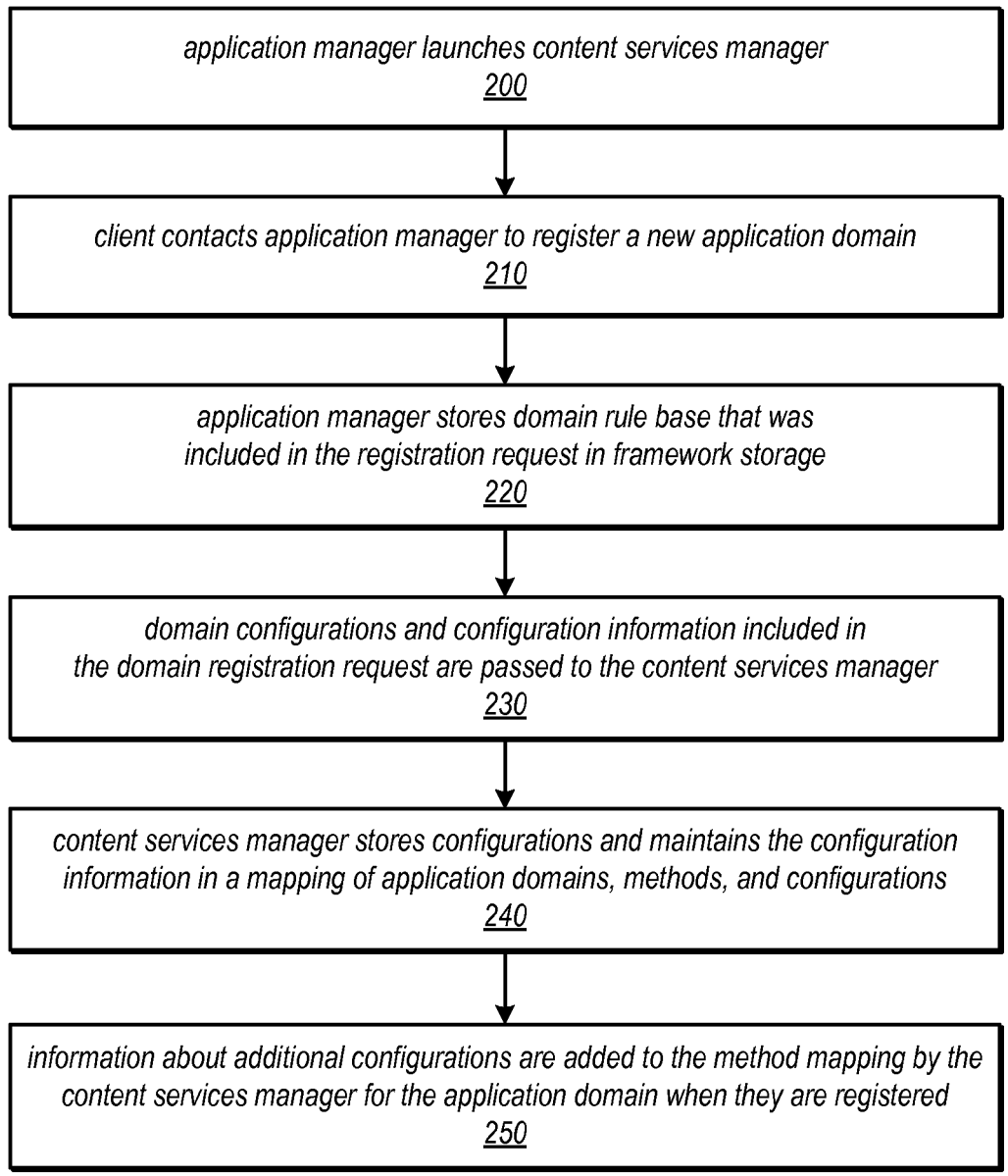
FIG. 2 is a flow diagram illustrating one embodiment of a method for registering an application domain in a cloud-independent application management framework, according to some embodiments.

FIG. 2 is a flow diagram illustrating one embodiment of a method for installing a new application domain in a cloud computing environment (e.g., for registering an application domain in an application framework executing in the cloud computing environment). As illustrated at 200, in this example, the method may include an application manager of an application framework instance (such as application manager 110 illustrated in FIG. 1) launching a content services manager (such as content services manager 130 illustrated in FIG. 1). Note that in various embodiments, while the content services manager launched by the application manager to help manage configurations may be dedicated to managing configurations of a single application domain, it may not be application-domain-specific. In other words, the content services manager may be an instance of a fairly generic component for use in managing applications within the framework architecture described herein.

As described herein, the content services manager may be responsible for maintaining the configuration information for registered application domains. As illustrated at 210, the method may include a client (such as client 100 illustrated in FIG. 1) contacting the application manager of the framework to register a new application domain. For example, the client may send a registration request to the application manager for a new application domain. As described herein, the registration request may include one or more domain configurations (i.e. one or more collections of methods and/or utilities to be provide by the application) and a domain rule base for the new application domain. In some embodiments, the domain rule base may be stored in framework storage (e.g., in the cloud computing environment) by the application manager, as shown in 220. For example, the domain rule base may be stored in a particular partition of the framework storage dedicated for the use of this new application domain and its configurations.

As illustrated at 230, the method may include the application manager passing the domain configuration(s) and/or other configuration information to the content services manager. The content services manager may then store and maintain the domain configuration(s) and/or other configuration information in the framework storage, as in 240. As described herein, the configuration information may be maintained in mappings between application domains, configurations, and methods. For example, in some embodiments, the content services manager may maintain a mapping for each application domain identifying the configurations, methods, etc., that have been registered and/or installed for that application domain and (once launched) identifiers of the content services servers on which they may be invoked. In some embodiments, the domain configuration(s) and/or other configuration information (e.g., the mappings) may be stored in a particular partition of the framework storage dedicated for the use of this new application domain and its configurations.

As illustrated at 250 in FIG. 2, as additional configurations (and their configuration objects) are registered with the application manager, information about those configurations may also be added to the mappings that the content services manager maintains. For example, in some embodiments, if additional configurations are registered for a given application domain, they may be added to the mapping maintained by the content services manager for that application domain when they are registered.

As previously noted, in the application framework architecture described herein, an application may be defined by a set of configurations and one or more rule bases. In some embodiments, to install an application configuration, a client may present an application domain identifier (e.g., a GUID or random string that identifies the application domain to which the configuration applies), a configuration (e.g., code and metadata for the configuration), and a rule base to the application manager to be installed in the application framework storage (e.g., in a partition for the identified application domain). In some embodiments, a content services manager may be responsible for the overall configuration management within an application domain. Note that a content services manager may be configured to provide different functionality than the content services servers that are subsequently launched to provide the methods of various application configurations, although in some embodiments it may include a lot of the same code as those content services servers.

Figure 3:
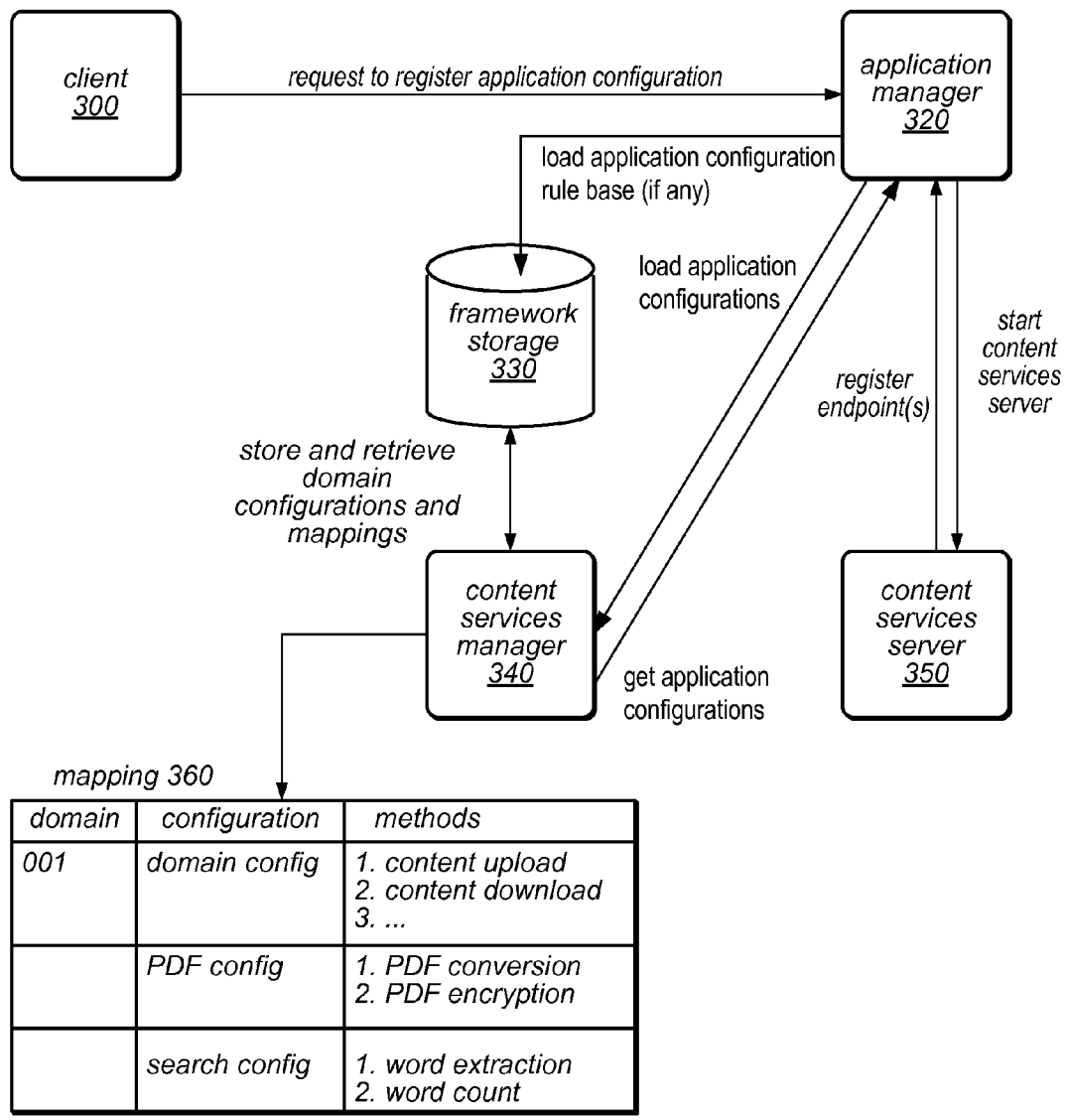
FIG. 3 is a block diagram illustrating various components of a cloud-independent application management framework and their use in registering an application configuration, according to some embodiments.

FIG. 3 is a block diagram illustrating various components of the scalable application framework described herein, and the use of these components in registering and/or installing an application configuration in a cloud computing environment, according to one embodiment. As shown in this example, a client 300 may send a request to register a new application configuration to an application manager instance 320 executing in the cloud computing environment. For example, an application developer or application provider may access application manager 320 through a client 300 to install new application configurations in the cloud computing environment. In some embodiments, such a request may include an application domain ID, any number of methods bundled into one or more configurations, and (in some cases) a rule base that is specific to a particular application configuration. The application configuration may in some embodiments include code (e.g., code to implement various methods, services, and/or utilities provided by the application), and an object that describes the methods, services, and/or utilities (e.g., authenticators) contained in the code.

In response to receiving the request to register the application configuration, the application manager 320 may load an application configuration rule base that was included in the request (if any) into framework storage 330 (e.g., in a partition within framework storage 330 allocated for and/or assigned to the specified application domain). As described herein, in some embodiments, framework storage 330 may also be located in the cloud computing environment. In some embodiments, in response to receiving the request to register an application configuration, the application manager 320 may initiate loading the application configuration specified in the request. For example, in some embodiments, the application manager 320 may pass the application configuration to a content services manager 340, which may store the application configuration in framework storage 330, and add configuration information to the mappings it maintains for the specified application domain.

In the example illustrated in FIG. 3, as a result of registering two application configurations in the application domain identified by an application domain ID 001, the content services manager has added information about these application configurations to the domain-method mapping 140 illustrated in FIG. 1. The result is illustrated in FIG. 3 as domain-method mapping 360. In this example, the additional application configurations are labeled as "PDF config" (an application configuration that includes two methods: "PDF conversion" and "PDF encryption") and "search config" (an application configuration that includes two methods: "word extraction" and "word count"). In this example, after registering these two application configurations, the application identified by application domain ID 001 includes three configurations and content services manager 130 may be configured to maintains the mappings between these configurations, their methods, and any content services servers on which they may be invoked (e.g., by periodically probing the content services server instances launched by application manager 320 for this application domain). In some embodiments, domain-method mapping 360 may be stored (and subsequently kept up to date) in framework storage 330 by content services manager 340 (e.g., in a partition allocated for or assigned to the new application domain).

In some embodiments, in response to receiving the request to register a new application configuration, the application manager 320 may start one or more content services servers 350 (e.g., to provide one or more methods, services, etc. of the newly installed application configuration). For example, application manager 320 may launch and configure one or more content services servers 350 to provide those methods or services. In various embodiments, in order to launch content services servers 350, application manager 320 may fetch the appropriate application configuration from content services manager 340 (which may retrieve it from framework storage 330), start one or more servers, and may register endpoint information for those server(s). In other embodiments, application manager 320 may not launch any content services servers to provide the methods of a newly installed application configuration until explicitly requested to do so, e.g., until one or more methods of the new application configuration are requested by a client.

Note that in some embodiments, configurations and/or mapping information maintained by content services manager 340 may be stored in one or more databases in framework storage 330. In such embodiments, various database operations may be used to write data to and fetch data from framework storage 330, e.g., to load and/or update configurations and mappings, and/or to retrieve configurations and/or configuration information used in launching, configuring, and managing content services servers, or performing other functions within the framework architecture.

Figure 4:
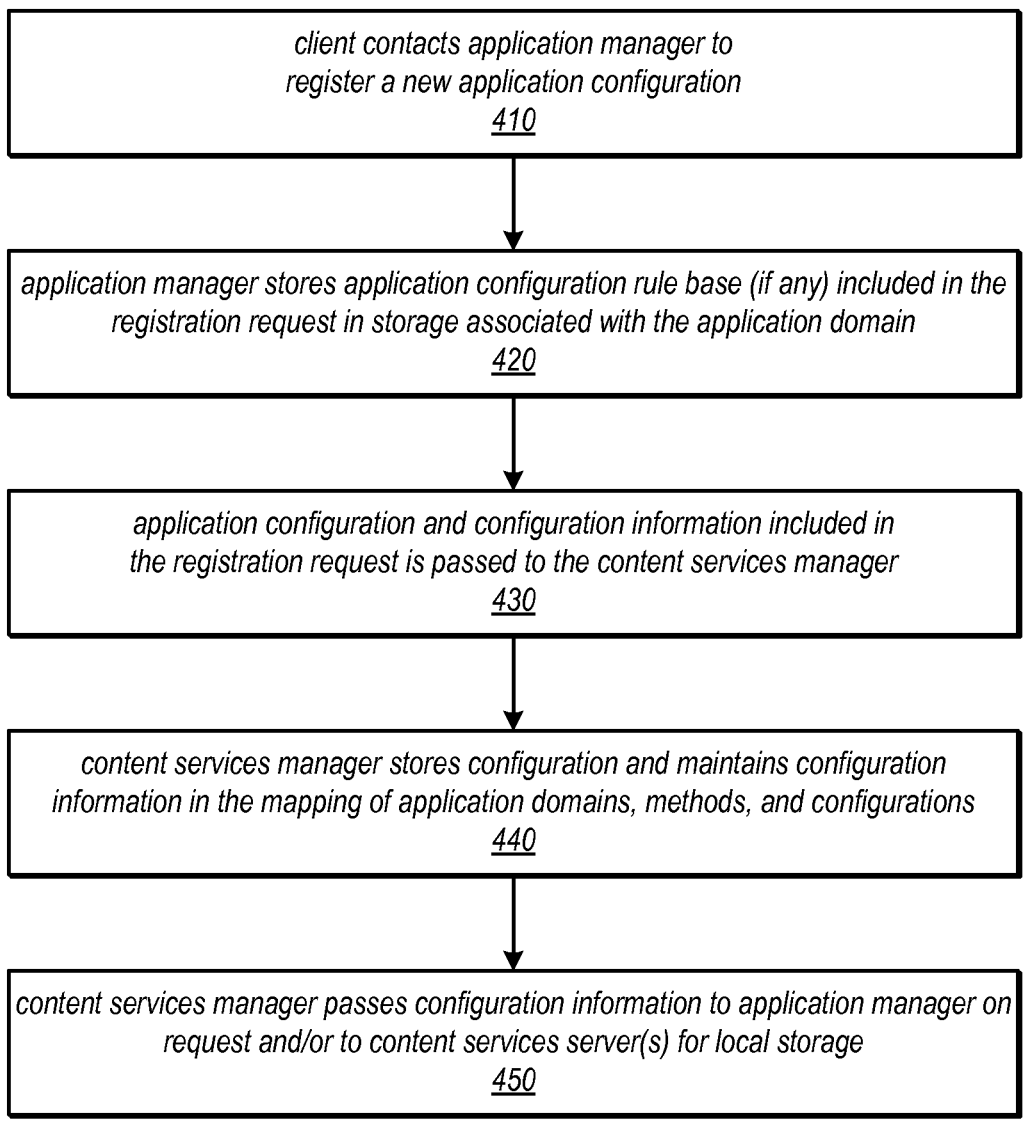
FIG. 4 is a flow diagram illustrating one embodiment of a method for registering an application configuration in a cloud-independent application management framework, according to some embodiments.

FIG. 4 is a flow diagram illustrating one embodiment of a method for installing an application configuration in an application domain, using the scalable application framework described herein. As illustrated at 410, the method may include a client contacting an application manager of one such framework executing in a cloud computing environment to register a new application configuration. For example, an application developer or application provider may access an application manager (such as application manager 320 in FIG. 3) through a client (such as client 300 of FIG. 3) to install a new application configuration in the cloud computing environment. In various embodiments, the registration request may include an identifier of the application domain in which the application configuration is to be installed (e.g., an application domain ID), one or more methods bundled into a configuration, and/or a rule base for the application configuration (i.e. one that is specific to the application configuration). Note that the application configuration (and its methods) may be bound by the application domain rule base whether or not a configuration-specific rule base is provided for the application configuration.

As shown at 420, in this example, the application manager may store the application configuration rule base included in the registration request (if any was provided) in framework storage associated with the application domain into which the application configuration is to be stored (e.g., in a partition allocated for and/or assigned to the application domain). As illustrated in FIG. 4, the method may include the application manager passing the application configuration (i.e. a collection of methods, services, and/or utilities to be provided by the application) and other configuration information included in the registration request to a content services manager for the application domain, as in 430. The content services manager may store the configuration and maintain the configuration information in its mapping of application domains, methods, and configurations, as in 440. For example, the content services manager may store the configuration and mapping in a partition of the framework storage that is allocated for and/or assigned to the application domain. In some embodiments, the method may include the content services manager passing the configuration information (e.g., the mapping information) to the application manager as part of the registration/installation process and/or on request. In some embodiments, the content services manager may also pass the configuration information (e.g., the mapping information) to one or more content services servers (e.g., servers configured to provide the methods and/or services of this and/or other application configurations in the application domain) for local storage, as in 450.

In some embodiments, once an application domain and one or more application configurations thereof are installed in application framework storage in a cloud computing environment, a client may invoke a method of one of the application configurations installed in the application domain. In some embodiments, the client may first request an endpoint from the application manager that will allow the client to invoke the method specified by a (domain ID, method name) pair included in the request. The application manager may consult the content services manager to determine endpoint information for a content services server on which the client can invoke the specified methods. If no content services server is currently configured to provide the specified method, the application manager may rely on the content services manager to map the (domain, method name) pair into one or more configurations that the application manager needs to load in a content services server (i.e. to configure a content services server instance to perform the requested method). After launching the content services server, the application manager may obtain the endpoint information for the content services server. In other words, the application manager may make sure that an appropriate content services server is running and may send the corresponding endpoint to the client.

Once the client receives the endpoint information, the client may send an HTTP request to the server identified by the endpoint (e.g., to invoke the specified method) and wait for a response. As illustrated in this example, because the client communicates with the endpoint using HTTP requests, and because most, if not all, cloud computing services support HTTP requests, the application and its methods may be cloud-independent. In other words, the application (and the entire application framework) may be implemented in any of a variety of cloud computing environments (e.g., those provider by various third-party cloud computing service vendors), and the actual cloud on which the application runs may be transparent to the client. As described in more detail below, the only portion of the framework architecture that may be specific to the cloud computing environment on which such a framework is installed may be a cloud interface library (or SPI) that translates generic requests for computing resources into the type of requests that are expected (and understood) by the underlying computing resources of a particular cloud computing environment. In some embodiments, the cloud interface library (or SPI) may be implemented by code stored in framework storage and may be accessible to all of the cloud-independent components of the application framework.

Figure 5:
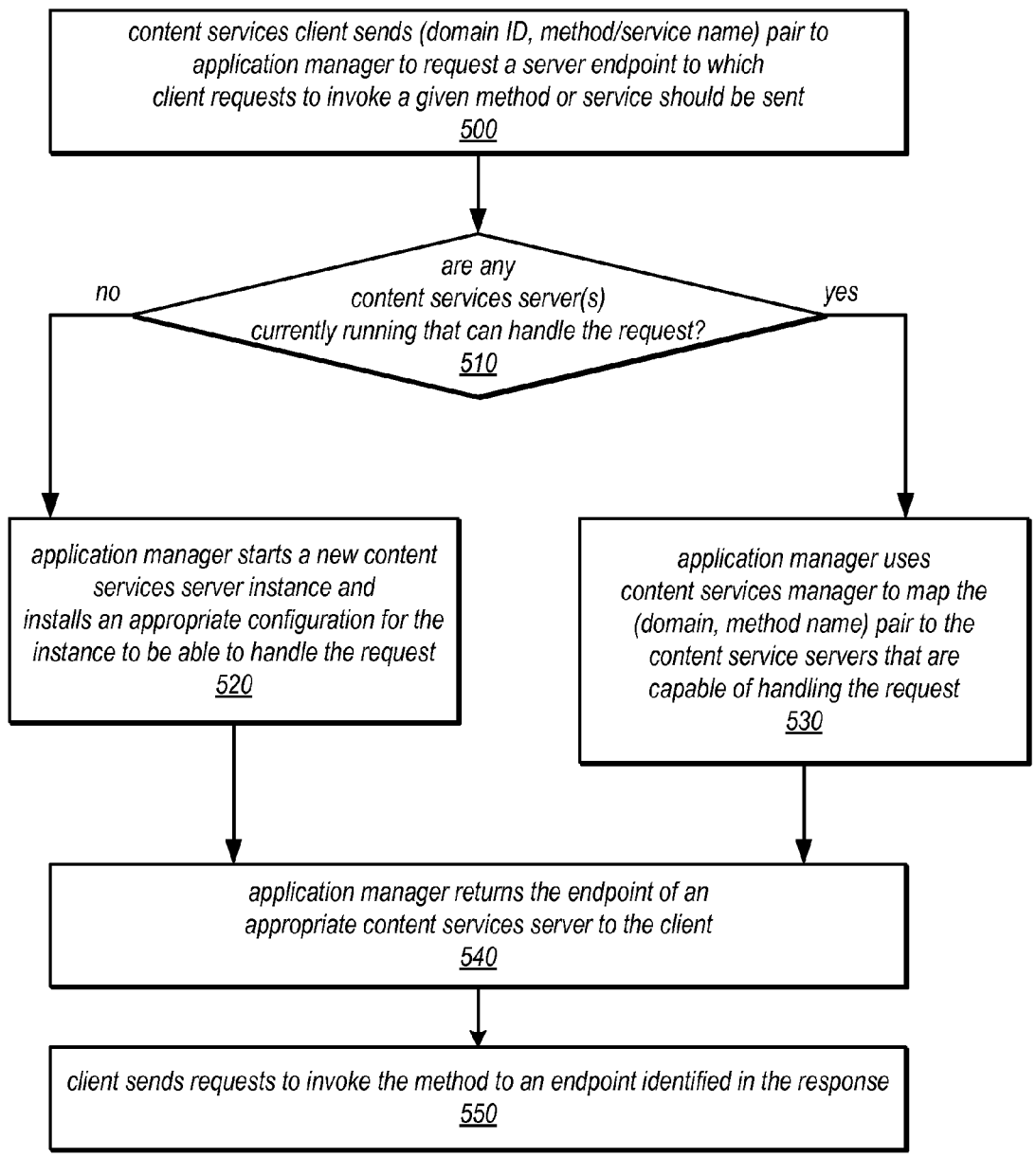
FIG. 5 is a flow diagram illustrating one embodiment of a method for requesting endpoint information for a content services server configured to execute a specified method or service installed and executing in a cloud computing environment, according to one embodiment.

FIG. 5 illustrates one embodiment of a method for invoking a method or service of an application configuration that has been installed in an application framework in a cloud computing environment. This figure illustrates a sequence of steps that may be performed to invoke such a method or service. As illustrated in this example, the method may include a client sending a domain identifier and an identifier of a particular method or service, e.g., a (domain ID, method/service name) pair, to an application manager of the framework to request a server endpoint to which requests to invoke the identified method or service should be sent, as in 500. For example, an end user, such as a customer or subscriber of service provided through a cloud computing service, may request (through a client) an endpoint for a content services server at which a method for managing and/or transforming the user's stored content may be invoked. For example, the user may wish to invoke a method for uploading one or more files, converting one or more files to a different format, or performing a keyword search on one or more uploaded files. As illustrated in FIG. 5, if an appropriate content services server is currently running for any application configuration within the identified application domain that can handle the request (shown as the positive exit from 510), the method may include the application manager contacting the content services manager for the application domain to map the specified (domain ID, method/service name) to an application configuration that is executing on a content services server and that is capable of handling the request, as in 530. Note that in some cases there may be more than one content services server running which can handle the method/service request.

If no content services server is currently running for any application configuration that can handle the request (shown as the negative exit from 510), the method may include the application manager starting a new content services server instance, and installing an appropriate application configuration on the content services server instance so that it will be able to handle the request, as in 520. Note that in some embodiments, the application configuration to be installed may be stored in the application framework storage, and may be provided to the application manager by the content services manager in response to a request from the application manager, as described herein. For example, the application manager may launch a content services server, contact the content services manager to request a appropriate configuration and its associated metadata, receive the configuration and associated metadata from the content services manager, and use this information to configure the newly launched content services server to provide the specified method/service. As illustrated at 540, the application manager may return the endpoint for an appropriate content services server to the client (e.g., one that was already running at the time the request was received or one that was newly launched and configured in response to the request). In some embodiments, the application manager may return only one endpoint for an appropriate content services server that is capable of handling the request. For example, if two or more content services servers are capable of handling the request, the application manager may select one of them (e.g., based on availability, performance, load balancing or other criteria) and returns its endpoint to the client. In other embodiments, the application manager may return an endpoint for each of two or more content services servers that are capable of handling the request.

As illustrated in this example, once the application manager has returned an appropriate endpoint to the client, the user may send the request to invoke the specified method or service to an endpoint identified in the response returned by the application manager, as in 550. For example, if only one endpoint is returned, the user may send a request to invoke the given method or service to the content services server corresponding to that endpoint (e.g., through the client). If more than one endpoint is returned, the user may select one of the content services servers corresponding to the returned endpoints, and may send a request to that content services server to invoke the requested method or service (e.g., through the client). In some embodiments, any subsequent requests to invoke this method/service may also be sent directly from the user to the content services server (e.g., through the client), without intervention by other components of the application framework.

Figure 6A:
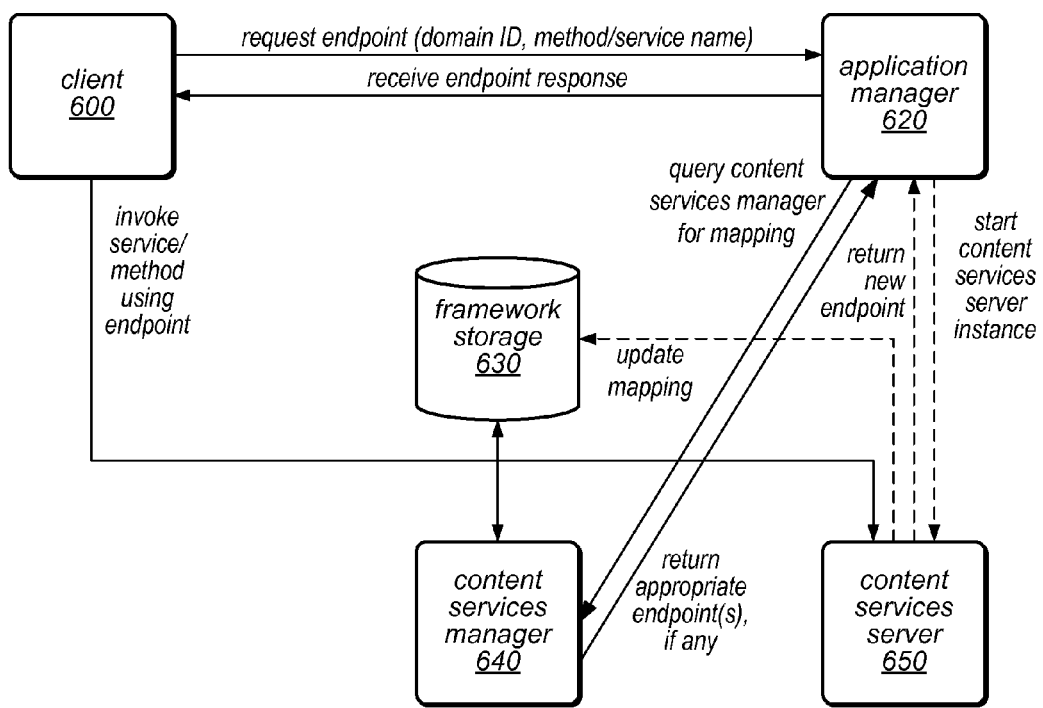
FIG. 6A is a block diagram illustrating various components of a cloud-independent application management framework and their use in requesting and receiving endpoint information for a content services server configured to execute a specified method or service, and in invoking the specified method or service, according to some embodiments.

FIG. 6A illustrates another example of the functionally of various components of the application framework described herein, according to one embodiment. As in previous examples, a client 600 may request an endpoint for a content services server from an application manager component of the framework (illustrated in FIG. 6A as application manager 620), and the request may include an identifier of an application domain (e.g., a domain ID) and an identifier of a method (or service) that the client wishes to invoke (e.g., a method/service name). In other words, a customer or subscriber of a service provided through a cloud computing service and managed by an application framework may send a request to application manager 620 via client 600 to obtain information about services offered by different content services servers instantiated in the specified application domain. Note that in some embodiments, application manager 620 may store a copy of the mappings maintained by content services manager 640 in framework storage 630 (e.g., a copy may be cached there), but such a cached copy might not always be available or up to date.

If the application manager 620 does not find an appropriate method-server mapping for the requested method/service locally (e.g., due to a restart of a server on which the application manager is executing or other reasons), the application manager may in some embodiments forward the request to the content services manager 640 and request that it check the mappings it maintains in framework storage 630 for this information. In some embodiments, if the information is found (e.g., in a mapping maintained by content services manager 640), the content services manager 640 may return the information (e.g., one or more endpoints for content services servers on which the requested method/service can be invoked) to the application manager 620, and the application manager 620 may return the information to client 600, as shown in FIG. 6. In other embodiments, the content services manager 640 may return the endpoint information directly to client 600 (not shown).

If no mapping is found, the application manager 620 may start a new content services server 650, and may configure it (according to an appropriate application configuration) to provide the requested method/service. In some embodiments, once the application manager 620 starts a new content services server instances, it may contact the content services manager 640 and provide information to allow content services manager 640 to update the mappings it maintains in framework storage 630. In other embodiments, the newly instantiated content services server 650 may register its endpoint locally, may return it to application manager 620, may register it with content services manager 640 (which may add an appropriate mapping to those it maintains in framework storage 630), and/or may provide a new mapping directly to framework storage 630. In the example illustrated in FIG. 6A, the application manager may return the endpoint information for the newly instantiated content services server 650 to client 600. In other embodiments, the endpoint information may be returned directly to client 600 by the newly instantiated content services server 650 (not shown).

Note that once a new content services server instance (such as content services server 650) is started, it may be managed using the application domain rule base defined when the application domain was registered, and may also be managed using a rule base specific to the application configuration that includes the requested method/service (if such a rule base was provided when the application configuration was registered in the scalable application framework). As previously noted, after receiving endpoint information, client 600 may invoke the method or service by sending a request directly to content services server 650, as shown in FIG. 6A.

In some embodiments, the application manager may provide a method that a user (e.g., an end user and/or an application developer) can invoke (e.g., through a client) to obtain a list of all of the currently available content services servers for a particular application configuration. In such embodiments, rather than requesting an endpoint for a particular method or service provided by an application configuration in a given application domain, a user or developer may request a list of all available methods and/or services. In some embodiments, the list of methods/services returned by the application manager may include one or more endpoints for content services servers on which each method or service can be invoked. In some embodiments, the application manager may provide the list in a preferred order (e.g., in "preference order") so that a client can choose a "best" option or a "good server" to use for a particular invocation.

Figure 6B:
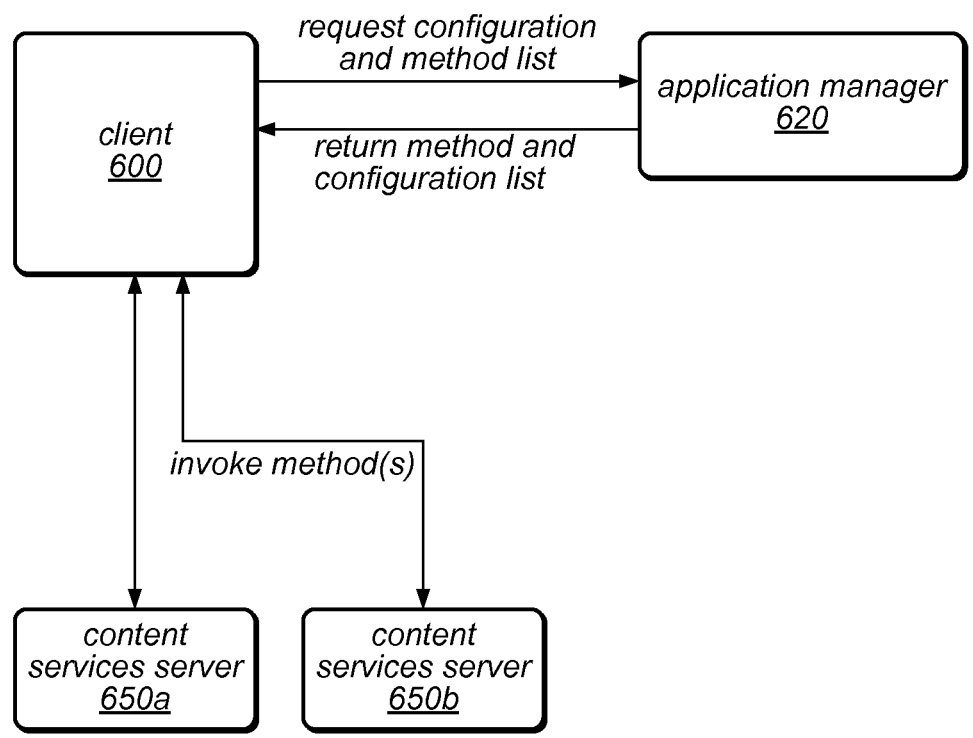
FIG. 6B is a block diagram illustrating various components of a cloud-independent application management framework and their use in requesting and receiving information about methods and services available in an application domain installed in a cloud computing environment, according to some embodiments.

FIG. 6B illustrates various components of an application framework and functionality for invoking such a method, according to one embodiment. In this example, client 600 may request configuration information and a method list from the application manager 620 (e.g., on behalf of an end user or application developer), and the application manager 620 may return the method and configuration list to client 600. In some embodiments, the application manager 620 may employ a content services manager for a given application domain to obtain and return information about the methods and/or services installed in the application domain (e.g., in various application configurations), and endpoint information for content services server instances (such as content services servers 650a and 650b in FIG. 6B) on which those methods or services may be invoked. As illustrated in FIG. 6B, after receiving this information from application manager 620, client 600 (e.g., on behalf of a user/developer) may invoke one or more methods or services on the content services servers configured to provide the methods or services, and for which endpoint information was obtained and returned to client 600. For example, client 600 may invoke a method to upload one or more files, convert one or more files to a different format, or perform a keyword search on one or more uploaded files (as in the detailed example described herein).

In some embodiments, after installing an application domain, and any additional methods and/or configuration objects, the application manager may launch one or more content services server instances to provide one or more of the installed methods and services. For example, a client may specify one or more methods or services in a request for service sent to the application manager, and in response, the application manager may launch one or more content services server instances to provide the specified methods/services and may send any method/service parameter values specified in the request to the newly launched content services server instances. The parameter values received from the client may in some embodiments be forwarded to the content services manager, which may write them out to persistent storage (e.g., a database in the application framework storage). This may ensure that the configuration specification can be retrieved even if the server on which the application manager is running is unavailable (e.g., if it goes down or is taken off-line). In various embodiments, the application manager and/or the content services manager may maintain a mapping of the launched instances and the methods/services they intend to provide. This information may also be updated by the content services server in the database specific to the appropriate application domain and/or in a database on each content services server that provides methods/services installed in the application domain. In some embodiments, this information may be made available as an object. In some embodiments, if the application manager is not available, this information may be obtained by the client directly from the persistent database (in framework storage) or from a database on one of the content services servers providing methods/services installed in the application domain.

In some embodiments, the application manager may periodically probe the content services server instances that provide methods/services installed in various application domains to maintain an updated map of configurations, methods, servers, and/or to obtain additional information about any executing methods or services, such as performance or cost information. In such embodiments, the responses of the content services server instances may be compared against the conditions specified by set of rules for the configurations installed on those content services server instances. For example, the responses may be compared against conditions specified by an applicable domain rule set (as identified by a unique application domain ID) and/or a configuration-specific rule base. In the case of a match, the action specified by the rule(s) may be taken. After each probe phase, the mapping may be updated again. In some embodiments, the application manager may perform such a probe phase periodically (e.g., on a regular basis at pre-defined intervals) to maintain up-to-date mappings and/or apply various rules. In other words, a probe phase and/or corresponding actions (e.g., re-mapping or application scaling) may not be triggered by any external request or event. In other embodiments, the application manager may provide support for responding to external triggers by probing content services servers instances and updating the mappings accordingly.

Figure 7:
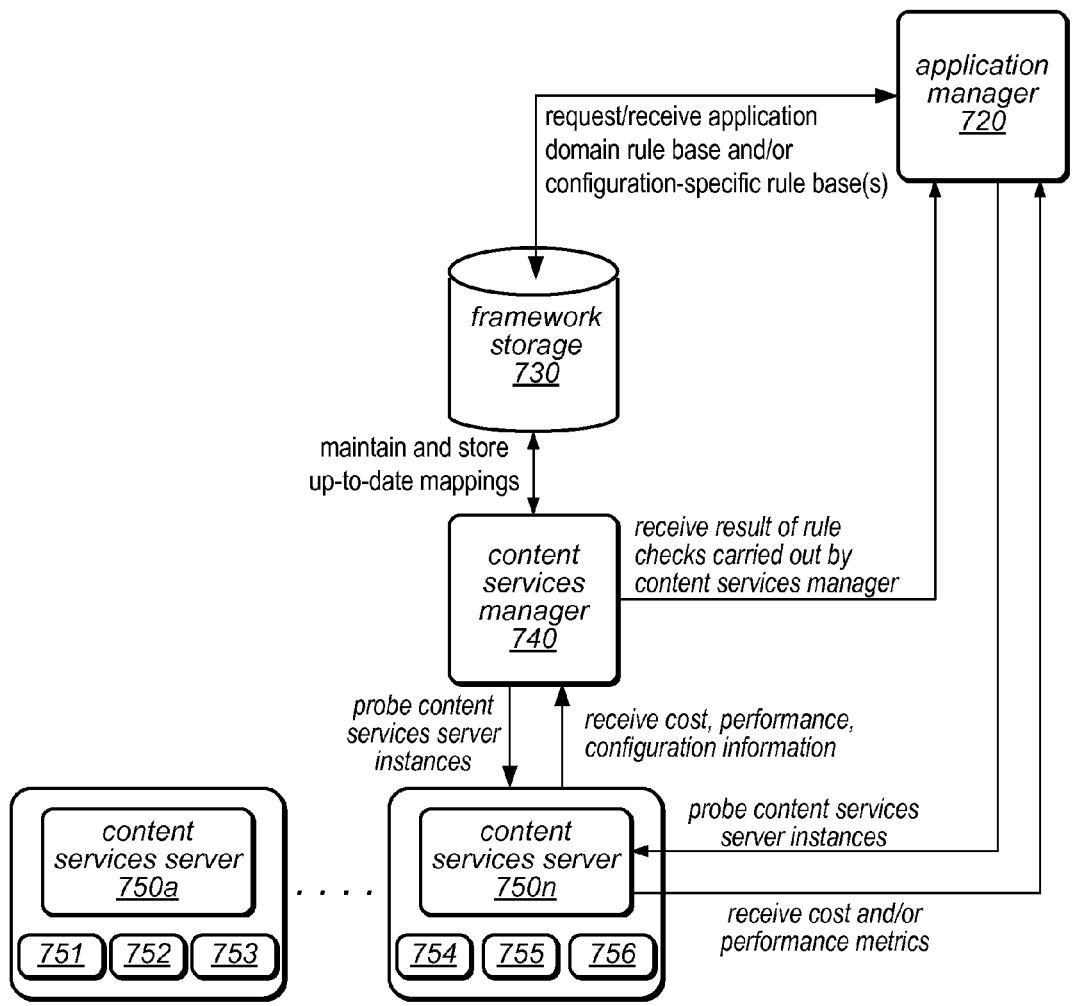
FIG. 7 is a block diagram illustrating various components of a cloud-independent application management framework and their use in managing scalable applications installed in a cloud computing environment using one or more rule bases, according to some embodiments.

FIG. 7 illustrates various components of an application framework and functionality for managing applications installed within the framework, according to one embodiment. As described herein, an application manager may be configured to manage and control the number and configuration of content services server instances in a cloud computing environment for a given application domain. For example, the application manager may be configured to scale the number and type of server instances according to changing demand and/or resource utilization, and in accordance with conditions specified in the rule bases for the application domain and/or application configurations installed in the application domain. In some embodiments, such rule bases may be stored in framework storage 730, along with method-server mappings and other configuration information, when application configurations are installed. As described herein, the information maintained in framework storage 730 by content services manager 740 may be updated when additional application configurations are installed, when content services server instances are launched and configured, and at other times.

As illustrated in FIG. 7, in some embodiments, in managing one or more application configurations, an application manager (such as application manager 720) may request and receive an application domain rule base and/or any rule bases that are specific to particular application configurations (or portions thereof) from framework storage 730, in which they are stored (e.g., in a partition allocated for and/or assigned to the application domain). The application manager 720 may probe one or more content services server instances (such as content services servers 750a-750n, which are configured to provide methods 751-756) and may receive cost and/or performance metrics data in response. For example, the content services servers may in some embodiments supply one or more "metrics objects" when requested. In such embodiments, the content services servers may obtain metric object definitions from the configuration objects used to configure them to provide methods and services of a given application.

In some embodiments, application manager 720 may use the received metrics data to evaluate rules that are applicable to the application configurations (and/or methods thereof) on content services servers 750a-750n, to determine when and/or if one or more content services servers should be stopped, or when and/or if one or more additional content services servers should be started and configured (e.g., to provide more capacity in providing the methods of various application configurations).

As previously noted, in some embodiments, one or more of the conditions specified in one of the applicable rule bases may be evaluated by a configuration-specific method invoked by content services manager 740. For example, content services manager 740 may probe content services servers 750a-750n and receive cost, performance, and/or configuration information needed to evaluate various conditions in the rule base. In such embodiments, the content services manager 740 may return a Boolean result for these evaluations to application manager 740. In still other embodiments, content services manager 740 may store cost data, performance data or other information collected or aggregated from content services servers 750a-750n in framework storage 730 (not shown).

Figure 8:
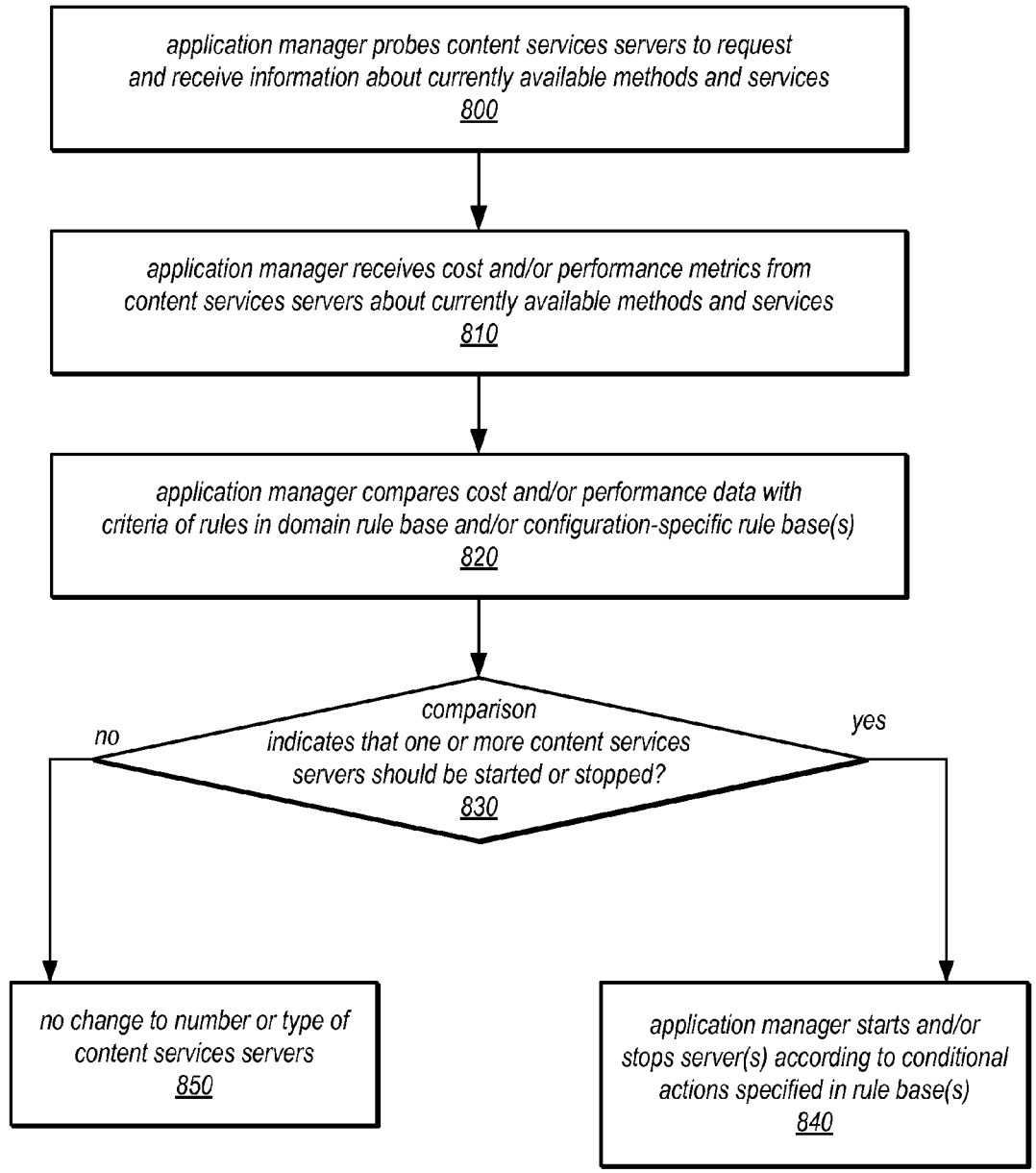
FIG. 8 is a flow diagram illustrating one embodiment of a method for managing scalable, cloud-independent applications installed in a cloud computing environment using one or more rule bases, according to some embodiments.

FIG. 8 illustrates one embodiment of a method for managing scalable applications in a cloud computing environment, using the application frameworks described herein. As previously noted, an application manager of such a framework may periodically probe the state of one or more application configurations executing within the framework and may apply various rules to the management of content services servers configured to provide the methods and/or services of those application configurations. As illustrated in FIG. 8, an application manager may probe one or more content services servers to request information about currently available methods and services, as in 800. For example, in some embodiments, the application manager (such as application manager 720 illustrated in FIG. 7) may request and receive performance data, cost data, or other execution-related data from the content services servers (such as content services servers 750a-750n illustrated in FIG. 7), as described above. As a result of probing the content services server(s) the application manager may receive or obtain cost and/or performance metrics from the content services servers about currently available methods and services, as in 810. In some embodiments, the application manager may fetch metrics data stored in an application domain partition by the content services servers or content services manager (not shown).

As illustrated in this example, the application manager may be configured to evaluate rules of an application domain rule base and/or configuration-specific rule base applicable to the currently available methods and services of a given application domain, as in 820. For example, the application manager may compare cost and/or performance data with criteria contained in rules of an applicable rule base. In some embodiments, a rule in an applicable rule base may specify an upper or lower limit on cost, performance, or throughput, which (if not met) may trigger an action by the application manager (e.g., starting or stopping one or more content services servers). Other types of rules may specify that content services servers should be started or stopped based on the length of a queue, the latency of responses to method invocations, or other cost or performance related criteria. In some embodiments, certain conditions may be evaluated by the content services manager (such as content services manager 740), which may return a Boolean result to the application manager.

If the evaluation of the rules against the collected data indicates that one or more content services servers should be started or stopped (e.g., if cost and/or performance data indicate that one or more methods or services are operating outside of criteria specified by the rules), shown as the positive exit from 830, the application manager may start or stop one or more servers according to conditional actions specified in the rule base(s), as in 840. If the evaluation of the rules against the collected data indicates that no action should be taken by the application manager, shown as the negative exit from 830, the application manager may make no changes to the number or type of content services servers executing within the application domain, as shown in 850.

Figure 9:
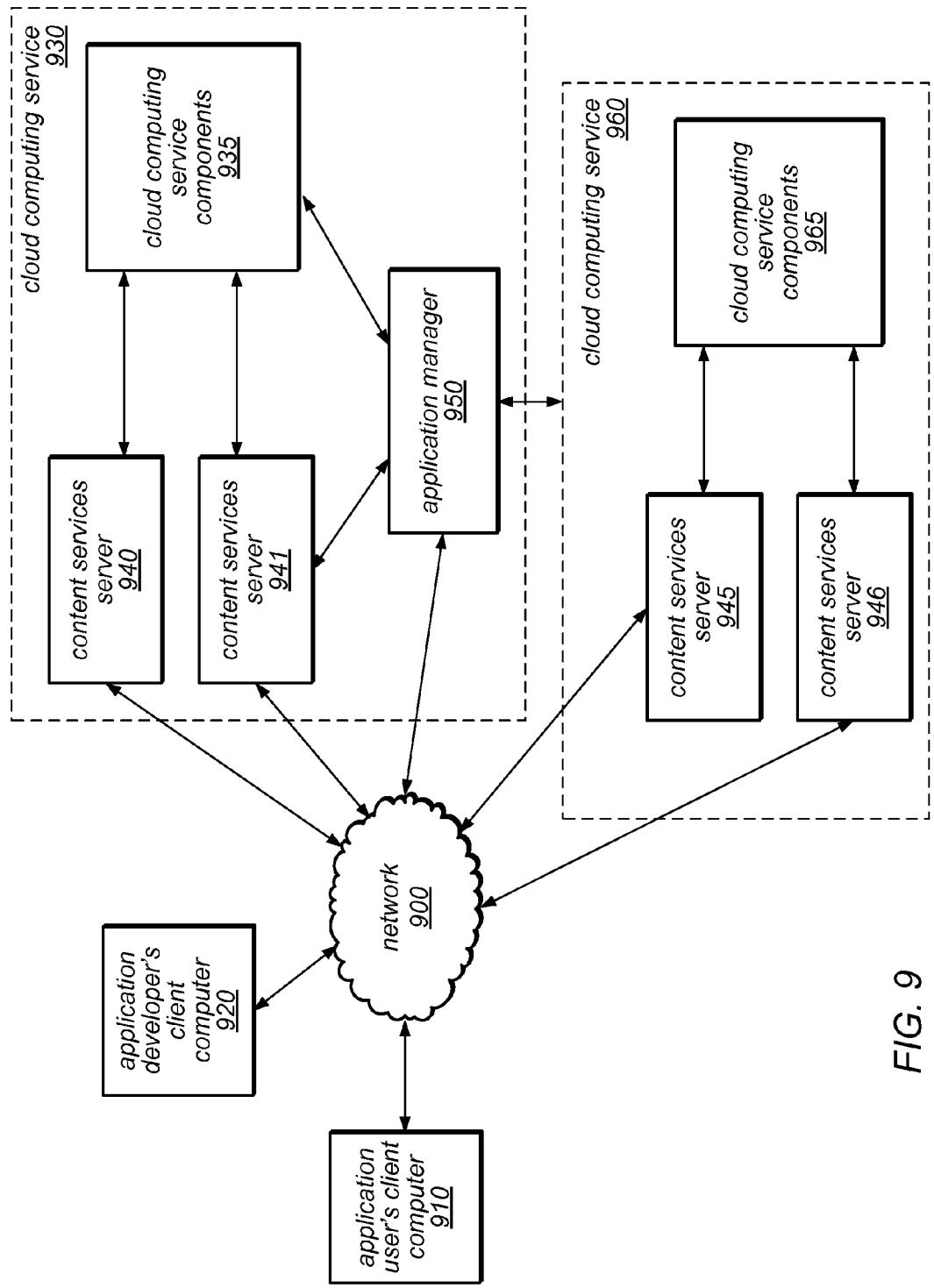
FIG. 9 is a block diagram illustrating various components of a cloud-independent application management framework and their relationships to underlying cloud computing services and to different users, according to some embodiments.

FIG. 9 is a block diagram illustrating various components of a cloud-independent application framework, their interactions with an underlying cloud computing service on which the framework is installed, and their interactions with different users, according to one embodiment. As illustrated in this example, the application framework may include an application manager 950 and multiple content services servers (e.g., content services servers 940, 941, 945, and 946). As previously noted, in some embodiments, a content services server may function as a content services manager (which may be considered a special-purpose content services server) for a given application domain. For example, content services server 940 or content services server 941 may be configured to function as a content services manager for an application domain installed in cloud computing service 930, and content services server 945 or content services server 946 may be configured to function as a content services manager for an application domain installed in cloud computing service 960. In this example, application manager 950 is shown as being installed within cloud computing service 930, and is illustrated as being able to communicate with content services servers and/or cloud computing service components in both cloud computing service 930 and cloud computing service 960. In other embodiments, a separate application manager may be installed in each cloud computing service and may only be configured to manage application configurations (and services or methods thereof) installed in various application domains registered on that cloud computing service (not shown).

In the example illustrated in FIG. 9, an application developer may connect to components of the application framework from client computer 920 through network 900. For example, the application developer may connect to application manager 950 through network 900 to register an application domain with a framework instance executing on one or more cloud computing services, such as cloud computing service 930 or cloud computing service 960, or to upload application configurations (including code for methods, metadata, etc.), rule bases, and/or other information into framework storage implemented on cloud computing service 930 and/or cloud computing service 960. In some embodiments, the framework storage may include a partition allocated for or assigned to a given application domain from storage available within the target cloud computing service (e.g., storage resources within cloud computing service components 935 or cloud computing service components 965). As described herein, the underlying cloud computing service on which an application domain is installed may be unknown to the application developer.

Once an application domain, and various rules bases, application configurations, methods, and/or services thereof, are installed, a user may contact application manager 950 from client computer 910 (through network 900) to request an endpoint for a specific method/service or request a listing of available methods/services. If one of the content services servers (e.g., content services servers 940, 941, 945, and 946) is configured to provide a requested method or service, endpoint information for the content services server may be returned to client computer 910 by application manager 950 through network 900. If none of the content services servers are configured to provide a requested method or service, application manager 950 may launch another content services server instance, configure it to provide the requested method/service, and return endpoint information for the newly launched content services server to client computer 910 through network 900. Subsequently, the user may invoke one or more methods or services provided by the application configurations running on one of the content services servers 940, 941, 945, or 946 by contacting them from client computer 910 through network 900, using the received endpoint information.

Figure 10:
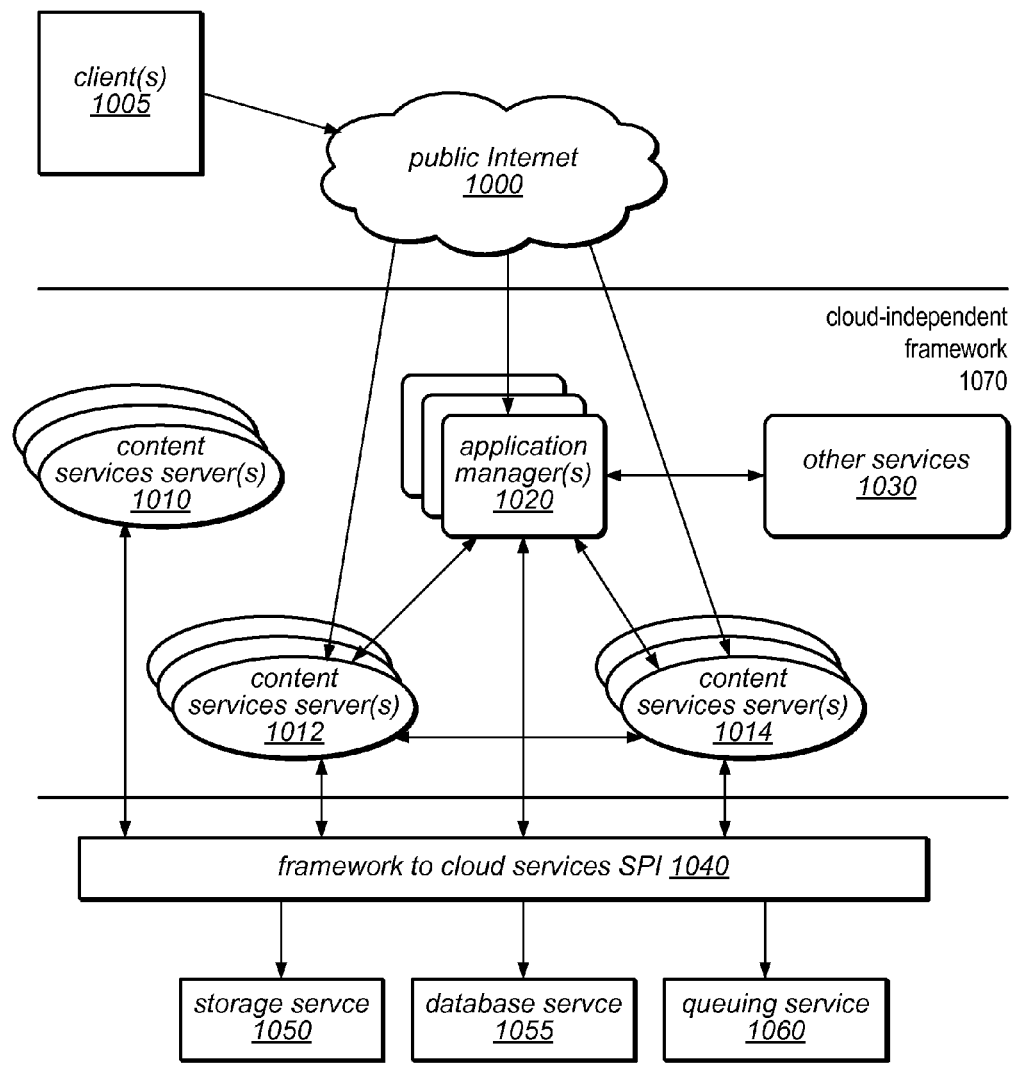
FIG. 10 is a block diagram illustrating various cloud-independent components of an application management framework and their communication with cloud computing resources through a cloud-specific service provider interface, according to some embodiments.

FIG. 10 illustrates another example of the use of a cloud-independent application framework to provide and manage scalable applications (e.g., application configurations, and methods/services thereof) in different cloud computing environments. FIG. 10 illustrates a static picture of a system implementing such a framework, according to one embodiment. In this example, clients 1005 may interact with the system over the Internet (1000), e.g., they may begin by sending a request to an application management component (e.g., an application manager 1020) to obtain information about the other application framework components (e.g., the location of various content services servers, such as content services servers 1010, 1012, or 1014, and/or the methods and services they are configured to provide). Once the clients 1005 find out about the methods and services that are available, they may access those methods and services by invoking them on the content services servers that are configured to provide them. Note that content services servers may come in different flavors, and their installation and configuration may be done through dynamic configuration mechanisms, such as those described herein. As illustrated in this example, clients 1005 may communicate with application managers 1020 through Internet 1000, clients 1005 may communicate with content services servers about which they have obtained at least endpoint information through Internet 1000, and content services servers may communicate with application managers 1020 and among themselves. In addition, application managers 1020 may communicate with other services provided by objects in the cloud-independent framework (e.g., authentication services, or other commonly provided utilities).

As illustrated in this example, all of these components may sit on top of a cloud services SPI layer (1040), and this SPI layer may provide those components access to various cloud computing service components that are implemented in the particular underlying cloud computing environment. In other words, this SPI layer may be the only framework related component that is specific to the particular underlying cloud, and it may be configured to translate cloud-independent requests for computing services (e.g., reads and writes directed to storage provided in the cloud computing environment, or invocation of methods provided by contents services servers executing on various machines in a pool of machines in the underlying cloud computing environment). As described herein, the cloud-independent components of cloud-independent framework 1070 could be installed in another cloud computing environment by replacing the illustrated SPI component with an SPI component that is specific to the other cloud computing environment. In the example illustrated in FIG. 10, the cloud computing components that may be accessed through SPI 1040 include a storage service 1050 (e.g., for bulk storage), a database service 1055 (e.g., for structured storage), and a queuing service 1060. In other embodiments, an underlying cloud computing environment in which an application framework is installed may include more, fewer, or different components that can be accessed through a cloud-specific SPI layer. As previously noted, storage for framework 1070 itself (e.g., its application configurations, methods, operating data, etc.) may be stored in storage provided by the cloud computing environment on which framework 1070 is installed (e.g., in storage service 1050 and/or database service 1055), in various embodiments.

In some embodiments, cloud-independence may be provided by the application framework in that the application configurations and rule sets are defined based on common interfaces for these framework components, and the application manager and content services manager manage all of the methods and services of the application configurations (according to the rule sets) when they are running in any of a variety of cloud computing environments. In other words, the particular cloud computing environment in which the framework (and the methods and services it provides) may be abstracted away from the client. In the example illustrated in FIG. 10, the SPI 1040 is the layer that abstracts the cloud-independent components within the framework from the underlying cloud in which the applications are running In this example, the application managers 1020 and content services servers (e.g., content services servers 1010, 1012, or 1014) may conform to this SPI (i.e. they may all be written using the SPI). When the framework components (e.g., the application manager and content services server instances) are installed in a particular cloud computing environment, an implementation of the SPI may need to be provided for that cloud. Above the SPI layer, however, the code to implement the components of the framework may be completely reusable, no matter what the underlying cloud is, and clients may interact with the applications and methods thereof by sending requests to the framework using a common interface (e.g., HTTP requests). As previously noted, the client may be told which service endpoint can provide a requested method/service, but it may have no knowledge of the underlying cloud computing environment on which it is running As previously noted, the services installed in an application domain may in some embodiments support triggered content processing. For example, the system may support registering predicates that attempt to match newly entered content. If a predicate is matched, the system may invoke an asynchronous request to perform an operation on content. In some embodiments, triggers may be cascaded, i.e. processing may create content that invokes more triggers.

Figure 11:
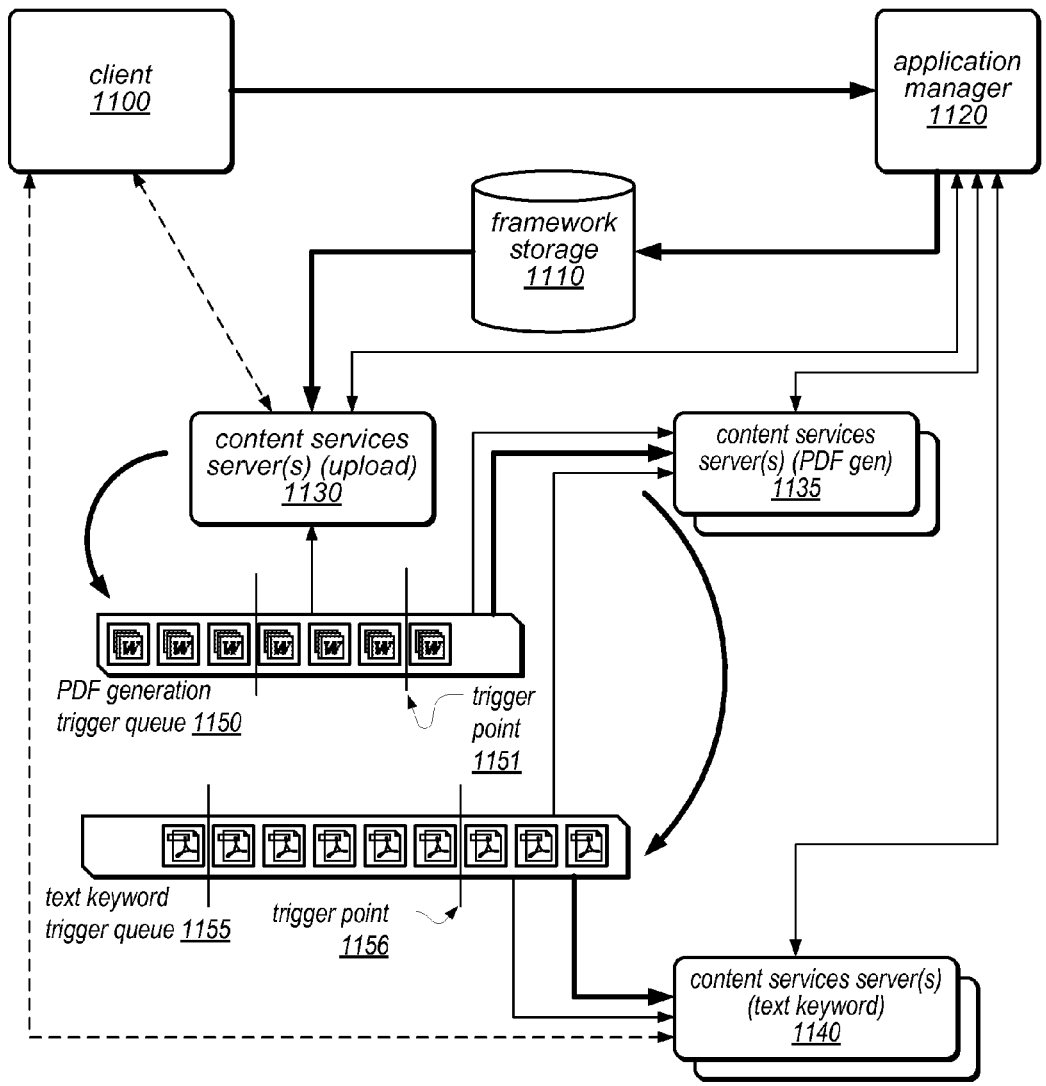
FIG. 11 is a block diagram illustrating a detailed example of the use of a cloud-independent application management framework to invoke a service that includes several cloud-independent methods, according to one embodiment.

FIG. 11 illustrates a detailed example of the use of a cloud-independent application framework to invoke a service that includes several scalable, cloud-independent methods, and that provides triggered content processing, according to one embodiment. In this example, a developer may have written cloud-independent methods for uploading documents, (e.g., text-based documents), automatically converting the documents to another format (e.g., generating PDF files from uploaded text documents), running a word extraction tool on those re-formatted files, performing a keyword search on those re-formatted files, and recording all the pages that include a specific keyword. The developer may then have composed the methods into an application configuration object and developed rules for managing the methods of that application configuration. In this example, the client may use these methods to do a query to find all of the documents that have a certain set of keywords, and to find out where those keywords appear in those documents. Initially, the framework may include an application manager 1120 and framework storage 1110, and may be accessed by a client 1100. The developer may register an application domain, provide configurations that combine these methods into an application, and provide one or more rule bases for the application and/or its configurations, as described herein. In some embodiments, the rule bases may specify how the application is to be scaled and managed. For example, a domain rule base (which may be loaded by the application manager as part of registering the application domain) may specify the number of instances of particular components that need to be started (e.g., the number of instances needed to achieve a particular throughput), and an acceptable cost for the service. The application manager may use these rules about an application to manage how the application actually behaves. In the example illustrated in FIG. 11 and described below, such rules may be used to determine points at which new content services servers should be started or points at which content services servers should be stopped.

In the example illustrated in FIG. 11, the following operations may be performed: client 1100 may ask the application manager 1120 for the endpoint of a content services server that it can use to upload documents (e.g., using an upload method of an application specified by its application domain ID). Application manager 1120 may consult the application configurations maintained in framework storage 1110 for the specified application domain to determine what it would take for the application manager 1120 to create such a server (e.g., how it should configure a content services server for this purpose, how many such content services servers it should create, etc.) Application manager 1120 may then instantiate a content services server 1130 and may configure it to be able to handle upload requests (e.g., using the upload method of one of the application configurations of the specified application domain that are installed in the framework). Note that in this example, it is assumed that all of the components illustrated in FIG. 11, other than client 1100, may be implemented in a cloud computing environment (e.g., on top of whatever storage the cloud computing environment provides). Note also that all of the content services servers created by application manager 1120 may be configured to return performance and/or cost information to application manager 1120, which may serve as inputs to various rules for managing and scaling the application (and the methods or services thereof that are running on those content services servers). As described herein, performance and/or cost information may be provided to an application manager in response to a request for such information, and/or periodically (and automatically), in various embodiments.

In this example, content services server 1130 was configured by application manager 1120 to perform uploads, i.e. application manager 1130 launched (instantiated) that server instance and configured it to provide the upload method of one of the configurations of the application. As noted above, content services server 1130 may (during operation) send information about the cost and performance of this method (and/or the content services server on which it is running) back to application manager 1120. At some point, client 1100 may start uploading documents (e.g., contacting content services server 1130 directly, after receiving its endpoint information from application manager 1120). In this example, the uploaded documents may be stored in the same cloud storage infrastructure that the application manager used when starting content services server 1130 (e.g., in a domain-specific partition in framework storage 1110).

Note that in some embodiments, triggers may be supported by the application framework components described herein. For example, in order to cause a transformation on uploaded content, a trigger may be registered in the framework, and the trigger may include a query condition and a queue. In some embodiments, when conditions observed in the system match the query condition, a content services server may start populating the queue. In the example illustrated in FIG. 11, when a pre-determined number of documents have been uploaded, content services server 1130 may begin adding them to PDF generation trigger queue 1150). At some point, the existence of a pre-determined number of documents in the PDF generation queue may cause the application manager to determine that it should start another content services server to begin generating PDF documents from the uploaded documents in PDF generation queue 1150. For example, there may be a set of rules associated with the management of particular content services server configurations that the application manager has loaded, including rules related to queue length. When the application manager receives information about the queue length, it may determine that there are enough documents in the queue to trigger the start of a content services server 1135 that is configured to convert them into PDF files. For example, in FIG. 11, the point at which this determination is made may correspond to trigger point 1151. Once the application manager starts content services server 1135 to execute the PDF generation method, the PDF generation service may start reading things off the PDF generation trigger queue and may follow a similar process. For example, the PDF generation service may be configured to generate PDF documents, and after generating them, to analyze them for keyword extraction. Therefore, the PDF generation service on content services server 1135 may set up a text keyword trigger queue 1155 in preparation for that activity.

At some point, the application manager may decide that there are enough documents in the PDF generation trigger queue 1150 to trigger the start of another instance (i.e., an exact copy) of content services server 1135, e.g., to help handle the workload of generating PDF documents from the uploaded documents in PDF generation trigger queue 1150. The application manager may also look at text keyword trigger queue 1155, and may determine when there are enough PDF documents in that queue to trigger starting up a content services server 1140 to perform the keyword extraction on the PDF documents in keyword trigger queue 1155. For example, in FIG. 11, the point at which this determination is made may correspond to trigger point 1156. As illustrated in FIG. 11, at some point, the client 1100 may contact content services server 1140 (i.e. the content services server that was performing keyword extraction) and may send queries to that server to determine which documents contain certain keywords. Content services server 1140 may then return the results of the queries about the keyword search to client 1100.

One set of rules for the detailed PDF generation and text extraction example above may be as follows (according to one embodiment):

```
Type: PDFGenerate
    Image: emi-24BB0CF6
    Initialsize= 2
    Conditions: minimum("config_PDFGenerate_queueLength",
    1) > 500
    Actions: start("PDFGenerate", 1) if poolsize("PDFGenerate") < 2
    Conditions: maximum("config_PDFGenerate_queueLength",
    1) < 50
    Actions: stop("PDFGenerate", 1) if poolsize("PDFGenerate") > 1
    Conditions: minimum("config_TextExtract_queueLength", 1) > 400
    Actions: start("TextExtract", 1) if poolsize("TextExtract") < 2
    Parameter: EC2_ACCESS_KEY=l1k2oiwdjn832qu4jaqw4
    Parameter: cluster=MyCluster01
Done:
```

According to these rules, the application manager may initially launch one or more content services server instances to perform uploading documents and placing them in the PDF generation trigger queue. If, at some point, the length of the PDF generation trigger queue exceeds 500 (and the number of content services server instances configured to perform PDF generation is less than 2), the application manager may launch another content services server instance, and may configure this newly launched content services server instance to generate PDF files from the uploaded documents and to place them in the test keyword trigger queue. If the length of the PDF generation trigger queue drops below 50 (and the number of content services server instances configured to perform PDF generation is greater than 1), the application manager may stop one of the content services server instances that is configured to perform PDF generation. In this example, if (at some point) the length of the test keyword trigger queue exceeds 400 (and the number of content services server instances configured to perform text extraction is less than 2), the application manager may launch another content services server instance, and may configure this newly launched content services server instance to perform text keyword extraction. Finally, the example rules above include a search parameter for the extracted keywords, and an identifier of a cluster (e.g. a cluster in a cloud computing environment) on which these methods are executing, and to which requests to invoke these methods should be directed.

The systems and methods described herein may be used to provide methods and services of a variety of applications that include tasks similar to those described in the examples herein. For example, different types of applications may manage "file-sized" content (e.g., maintaining content and metadata for file-sized data, and/or updating content and metadata using simple or complex versioning), may provide non-trivial searching on such metadata, and/or may perform different types and amounts of background content processing. In some embodiments, the system may support asynchronous invocation. For example, a client may deposit an authenticated method/service request, and may send a subsequent request to obtain the result. In some embodiments, the application framework components described herein may provide this and other functionality in systems on a very large scale (e.g., a cloud scale).

As previously noted, in some embodiments, an application (or method thereof) may invoke services provided by the cloud computing environment in which it is installed. One example of a method that invokes Adobe's LiveCycle™ (LC) Encryption functionality is as follows:

```
public ArgResultdoIt(ServerSessionsession, String method, ArgResultarg){
//Map input stream into LC Document object
    StreamInputStreaminput = new StreamInputStream(arg.GetStream( ));
    Document inDoc= new Document(input);
//Encrypt the PDF document
    ServiceClientFactorymyFactory= ServiceClientFactory.createInstance(...);
    EncryptionServiceClientencryptClient =
        new EncryptionServiceClient(myFactory);
    Document encryptDoc= encryptClient.encryptPDFUsingPassword(inDoc,...);
//Return encrypted Document as an output stream
    Stream result =
        new ISStream(encryptDoc.length( ), encryptDoc.getInputStream( ));
    return new ArgResult(..., result);
}
```

In this example, the method above may be used to encrypt an input document object and return the result. In this example, the methods may take a stream as an argument, and may return the results as a stream. Note that in some embodiments, the methods installed in a cloud computing environment may adhere to a generic method definition interface, as described herein.

Note that in conventional cloud implementations, applications are typically packaged with a single AMI, and do not implement the type of dynamic behavior described in the example above. By contrast, in the systems described herein, the executable components (e.g., the root AMIs) may be completely generic, and may be driven by the configurations and rule sets installed in the application framework storage (e.g., in a database). For example, the application manager may be configured to dynamically scale an application up or down, driven by one or more rules bases in the framework storage. In addition, the installation and configuration of various content services servers may be driven by configurations stored in the framework storage. Once these configurations and rule bases are installed in the application framework, various application management tasks may be performed without further intervention or external visibility (i.e. these tasks may be performed "under the hood").

Thus, the application frameworks described herein may allow the applications and methods they manage to be more general, and may allow multiple instances of these applications and methods to be installed and running in one or more cloud computing environments without change. In other words, the systems and methods described herein may facilitate a cookie cutter approach to application development and management in which, to develop a new application, a developer may write some number of cloud-independent methods, compose them in one or more configurations, determine out what the rules for managing the application should be, and upload the configurations and rules into the application framework, without needing to know what the underlying cloud computing environment looks like. Instead, the developer may simply install the application through the application manager. Similarly, when a client wants to use the application, the client may make a lookup request through the application manager and then send the actual method or service request to the endpoint it returns, again without needing to know anything about the underlying cloud computing environment. In addition, exactly the same application (e.g., the same application configuration objects) may be installed in multiple cloud computing environment, without the knowledge of any user (e.g., under the control of the application manager). In some embodiments, a single application manager instance may access applications, methods, and/or framework storage on multiple clouds. In general, the application framework described herein (including the application manager and various content services servers) may do the work of building, installing and configuring an application that is cloud-independent on behalf of an application developer, to the benefit of the developer and/or various clients.

Some embodiments of the systems described herein may include a means for managing cloud-independent, scalable applications in a cloud computing environment. For example, a cloud-independent application manager module may receive requests to install one or more application domains and/or application configuration objects, launch and configure one or more content services manager instances, launch and configure one or more content services server instances, receive requests for information about installed methods or services, provide information about installed methods or services and/or endpoint information for content services servers on which they may be invoked, obtain and/or evaluate rules applicable to installed applications, and/or take action to scale applications in response to such an evaluation, as described herein. The cloud-independent application manager module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving requests to install one or more application domains and/or application configuration objects, launching and configuring one or more content services manager instances, launching and configuring one or more content services server instances, receiving requests for information about installed methods or services, providing information about installed methods or services and/or endpoint information for content services servers on which they may be invoked, obtaining and/or evaluating rules applicable to installed applications, and/or taking action to scale applications in response to such an evaluation, as described herein. Other embodiments of the cloud-independent application manager module may be at least partially implemented by hardware circuitry and/or firmware stored, for example, in a non-volatile memory.

Some embodiments may include a means for maintaining configuration information for application configurations in a cloud computing environment. For example, a cloud-independent content services manager module may receive one or more application configuration objects for applications installed in an application domain in a cloud computing environment, store the application configuration objects in a storage partition allocated for or assigned to the application domain, maintain a mapping between methods and/or services composed in the application configuration objects and the application domain as application configuration objects are registered and/or installed, ay maintain endpoint information for content services server instances on which the methods and/or services are executing, and/or collect and/or evaluate performance and/or cost metrics for methods and/or services executing in the cloud computing environment, as described herein. The cloud-independent content services manager module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving one or more application configuration objects for applications installed in an application domain in a cloud computing environment, storing the application configuration objects in a storage partition allocated for or assigned to the application domain, maintaining a mapping between methods and/or services composed in the application configuration objects and the application domain as application configuration objects are registered and/or installed, maintaining endpoint information for content services server instances on which the methods and/or services are executing, and/or collecting and/or evaluating performance and/or cost metrics for methods and/or services executing in the cloud computing environment, as described herein. Other embodiments of the cloud-independent content services manager module may be at least partially implemented by hardware circuitry and/or firmware stored, for example, in a non-volatile memory.

Some embodiments may include a means for requesting and invoking cloud-independent methods and services in a cloud computing environment. For example, an application framework client module may be configured to communicate with the cloud-independent application manager module and/or content services server modules to obtain information about, invoke, and/or receive results of the invocation of various cloud-independent methods and/or services composed in one or more application configuration objects installed in an application domain in the cloud computing environment. The application framework client module may send requests to the application manager to obtain information about available methods and services, may send requests to one or more content services server modules to invoke those methods or services, and/or may receive results of the execution of the methods or services from the content services server modules, as described herein. The application framework client module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform sending requests to the application manager to obtain information about available methods and services, sending requests to one or more content services server modules to invoke those methods or services, and/or receiving results of the execution of the methods or services from the content services server modules, as described herein. Other embodiments of the application framework client module may be at least partially implemented by hardware circuitry and/or firmware stored, for example, in a non-volatile memory.

Some embodiments may include a means for executing cloud-independent methods and services in a cloud computing environment. For example, one or more cloud-independent content services server modules may be instantiated in an application management framework and configured to execute cloud-independent methods and/or services composed in one or more application configuration objects. The cloud-independent content services server modules may receive requests from clients to invoke those methods or services, access resources of the cloud computing environment through a cloud-specific service provider interface during execution of the methods or services, and/or return results of the execution to the clients, as described herein. The cloud-independent content services server modules may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving requests from clients to invoke the methods or services, accessing resources of the cloud computing environment through a cloud-specific service provider interface during execution of the methods or services, and/or returning results of the execution to the clients, as described herein. Other embodiments of the cloud-independent content services server modules may be at least partially implemented by hardware circuitry and/or firmware stored, for example, in a non-volatile memory.

Some embodiments may include a means for cloud-independent components of a scalable application management framework to access resources of a cloud computing environment in which the framework is installed. For example, a cloud-specific service provider interface module may be communicatively coupled between one or more cloud-specific resources (e.g., execution resources and/or storage resources) and one or more cloud-independent components of the application management framework that are installed and executing in a cloud computing environment. The cloud-specific service provider interface module may receive cloud-independent messages or commands from the one or more cloud-independent components of the application management framework and may translate or transform them into messages or commands recognizable to and/or actionable by the one or more cloud-specific resources to execute methods and/or services composed in one or more application configuration objects installed in an application domain in the cloud computing environment, as described herein. The cloud-specific service provider interface module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving cloud-independent messages or commands from one or more cloud-independent components of an application management framework installed in a cloud computing environment, and translating or transforming them into messages or commands recognizable to and/or actionable by one or more cloud-specific resources of the cloud computing environment to execute methods and/or services composed in one or more application configuration objects installed in an application domain in the cloud computing environment, as described herein. Other embodiments of the cloud-specific service provider interface module may be at least partially implemented by hardware circuitry and/or firmware stored, for example, in a non-volatile memory.

Example System

Figure 12:
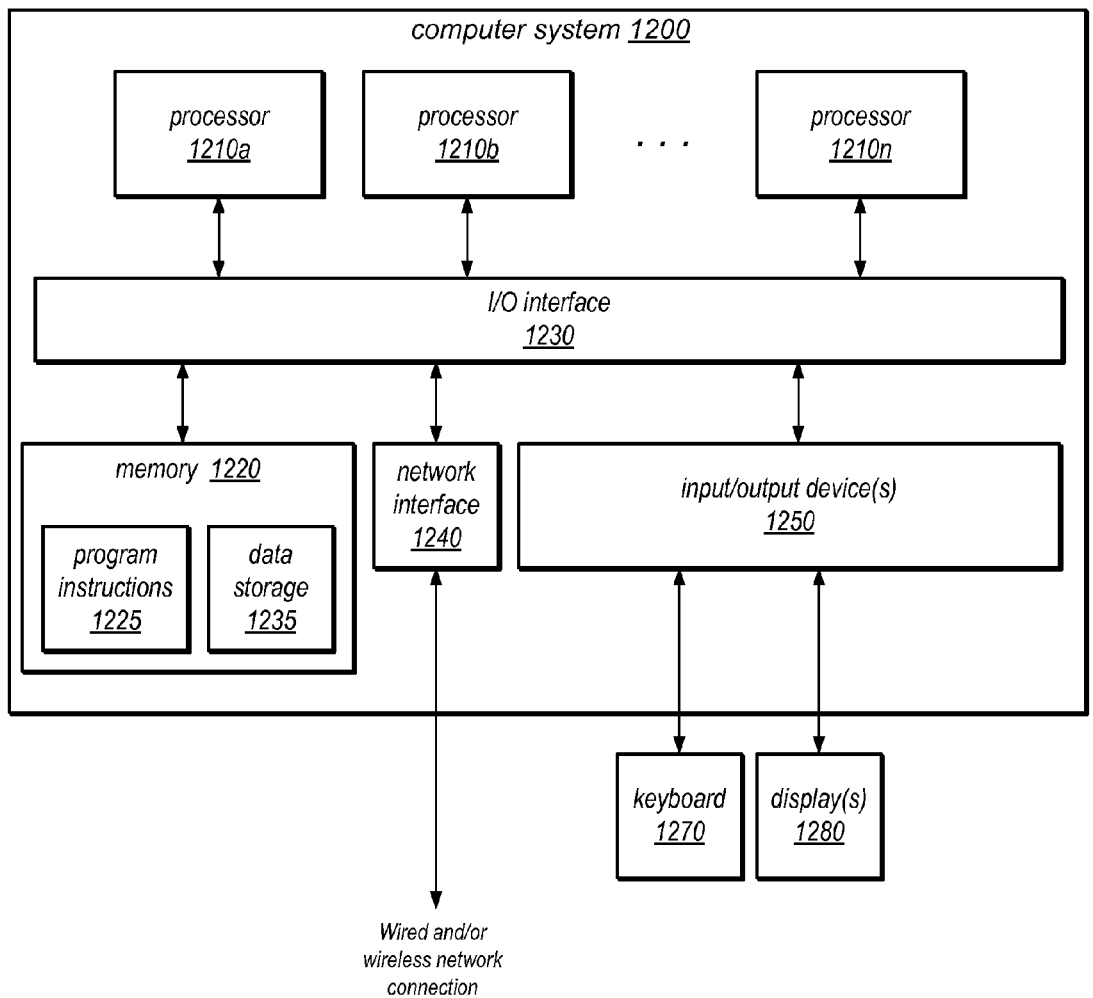
FIG. 12 illustrates an example computer system that may be used in various embodiments.

Some embodiments of the cloud-independent application framework described herein (and/or the components thereof) may be implemented on one or more computer systems, which may interact with various other devices to provide the functionality described herein. One such computer system is illustrated by FIG. 12. In different embodiments, computer system 1200 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as keyboard 1270, and display(s) 1280. In some embodiments, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements. In some embodiments, a client of an application framework may be implemented on one instance of computer system 1200, and an application framework instance (including an application manager instance, one or more content services servers, a content services manager, and/or framework storage for one or more application domains) may be implemented on one or more other instances of computer system 1200 (e.g., computer systems of a cloud computing environment provided by a cloud computing services vendor).

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA. In some embodiments, at least one processor 1210 may be a graphics processing unit.

System memory 1220 may be configured to store program instructions and/or data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the cloud-independent application framework components and various methods disclosed herein are shown stored within system memory 1220 as program instructions 1225 and data storage 1235, respectively. In other embodiments, program instructions and/or data may be received, sent or stored upon different types of computer-accessible media or on similar media separate from system memory 1220 or computer system 1200. Generally speaking, a computer-accessible medium may include a non-transitory storage media or memory media such as magnetic or optical media, e.g., disk or CD/DVD-ROM coupled to computer system 1200 via I/O interface 1230. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1240.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. In addition, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems, or between nodes of computer system 1200. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or retrieving data by one or more computer system 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1225, configured to implement embodiments of a cloud-independent application framework as described herein, and data storage 1235, comprising various data accessible by program instructions 1225. In one embodiment, program instructions 1225 may include software elements of embodiments of a cloud-independent application framework as illustrated in the above figures. Data storage 1235 may include data that may be used in some embodiments. In other embodiments, other or different software elements and data may be included.

Those skilled in the art will appreciate that computer system 1200 is merely illustrative and is not intended to limit the scope of the application frameworks described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the systems and methods described herein may be implemented using other computer system configurations.

Various embodiments may further include receiving, sending or storing instructions and/or data implemented in accordance with the foregoing description upon a computer-accessible medium. Generally speaking, a non-transitory computer-accessible storage medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may also include transmission media or signals such as electrical, electromagnetic, or digital signals, conveyed via a communication medium such as network and/or a wireless link.

The various methods as illustrated in the figures and described herein represent example embodiments of methods. The methods may be implemented in software, hardware, or a combination thereof The order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A computer-implemented method, comprising:
executing a cloud-independent application manager, that is included as part of a cloud-independent application framework instance in a cloud computing environment capable of supporting multiple cloud-independent application framework instances, on one or more computers to perform operations including:
receiving a request to register an application configuration in the framework instance, the request comprising one or more cloud-independent methods included as part of an application configuration object, an identifier of an application domain that is registered to the framework instance, and rules that the application manager is to apply to manage content services servers that are employed by the framework instance to deploy the one or more cloud-independent methods;
storing the rules in framework storage allocated to the application domain and configured to store the application configuration; and
sending the application configuration object to a cloud-independent content services manager of the framework instance, the application configuration object enabling the content services manager to map the one or more cloud-independent methods to the application domain and store a mapping of the one or more cloud-independent methods in the framework storage.

2. The computer-implemented method of claim 1, further comprising:
starting one of the content services servers in the cloud computing environment; and
configuring the content services server to execute at least one of the one or more cloud-independent methods, wherein said configuring is dependent on contents of the application configuration object.

3. The computer-implemented method of claim 2, wherein said starting the content services server is performed in response to receiving a request to invoke the at least one of the one or more cloud-independent methods or in response to receiving a request for endpoint information for a content services server on which the at least one of the one or more cloud-independent methods can be invoked.

4. The computer-implemented method of claim 1, further comprising:
receiving a request for a listing of methods or services available in the application domain; and
in response to said receiving the request for the listing of methods or services available, returning information comprising the listing of the methods or services available in the application domain and an indication of one or more of the content services servers on which each of the methods or services available in the application domain can be invoked.

5. The computer-implemented method of claim 1, further comprising:
receiving a request for information from a client indicating one of the content services servers executing in the cloud computing environment on which a given one of the one or more cloud-independent methods can be invoked; and
in response to receiving the request for information, sending endpoint information to the client identifying the content services server on which the given one of the one or more cloud-independent methods can be invoked, the endpoint information enabling the given one of the one or more cloud-independent methods to be requested from the identified content services server, the given one of the one or more cloud-independent methods being executable by the identified content services server on behalf of the client by accessing one or more resources of the framework instance, the one or more resources being accessible through a cloud specific service provider interface that is communicatively coupled to one or more cloud-independent components of the application domain.

6. The computer-implemented method of claim 1, further comprising:
prior to receiving the request to register the application configuration:
receiving a request to register the application domain in the framework instance, the request to register the application domain comprising domain configuration information and a domain rule base; and
in response to receiving the request to register the application domain:
storing the domain rule base in the framework storage allocated to the application domain;
launching the content services manager in the framework instance; and
sending the domain configuration information to the content services manager, the sending enabling the content services manager to store the domain configuration information in the framework storage, the domain configuration information and the domain rule base subsequently being usable to manage one or more application configurations registered in the application domain.

7. The computer-implemented method of claim 6, wherein in response to receiving the request to register the application domain, the method further comprises:
obtaining a partition of the framework storage for use of the application domain;
wherein the domain rule base is stored in the partition of the framework storage; and
wherein the domain configuration information is stored in the partition of the framework storage.

8. The computer-implemented method of claim 1, wherein the rules included in the request comprise conditions and corresponding actions that are subsequently usable in managing the content services servers.

9. The computer-implemented method of claim 1, further comprising:
probing one or more of the content services servers to obtain performance or cost metrics for at least one of the one or more cloud-independent methods;
evaluating one or more rules of a domain rule base for the application domain or the rules included in the request against the obtained performance or cost metrics; and
in response to determining that one or more conditions specified in the one or more rules is met, causing an application to be scaled that comprises the application configuration.

10. The computer-implemented method of claim 9, wherein causing the application to be scaled comprises:

starting an additional content services server instance and configuring the additional content services server instance to execute at least one of the one or more cloud-independent methods; or stopping a content services server instance that is configured to execute at least one of the one or more cloud-independent methods.

11. A system, comprising:
one or more processors; and
a memory comprising program instructions that are executable by the one or more processors to implement an instance of an application management framework in a cloud computing environment capable of supporting multiple application management framework instances, the framework instance comprising:
a cloud-independent application manager configured to receive a request to register an application configuration in the framework instance, the request comprising one or more cloud-independent methods included as part of an application configuration object, an identifier of an application domain that is registered to the framework instance, and rules that the application manager is to apply to manage cloud-independent content services servers, the cloud-independent application manager further configured to store the rules in framework storage allocated to the application domain;
a cloud-independent content services manager configured to receive the application configuration object from the application manager, map the one or more cloud-independent methods to the application domain, and store a mapping of the one or more cloud-independent methods in the framework storage;
one or more cloud-independent content services servers that are configured to deploy the one or more cloud-independent methods to one or more clients; and
a cloud-specific service provider interface that is communicatively coupled to one or more cloud-independent components of the framework instance.

12. The system of claim 11, wherein the application manager is further configured to:
start at least one of the cloud-independent content services servers in the cloud computing environment; and
configure the at least one content services server to execute at least one of the one or more cloud-independent methods based on contents of the application configuration object.

13. The system of claim 11, wherein:
the application manager is further configured to:
receive, from one of the clients a request for information identifying at least one of the cloud-independent content services servers on which a given one of the one or more cloud-independent methods can be invoked; and
in response to receiving the request for information, send endpoint information to the client identifying the at least one content services server on which the given one of the one or more cloud-independent methods can be invoked; and
the at least one content services server configured to:
receive a request to invoke the given one of the one or more methods; and
execute the given method on behalf of the client by accessing one or more resources of the framework instance through the cloud-specific service provider interface.

14. The system of claim 11, wherein:
the application manager is further configured to, prior to the request to register the application configuration being received:
receive a request to register the application domain in the framework instance, the request to register the application domain comprising domain configuration information and a domain rule base; and
in response to the request to register the application domain being received:
store the domain rule base in the framework storage allocated to the application domain;
launch the content services manager in the framework instance; and
pass the domain configuration information to the content services manager; and
the content services manager is further configured to:
store the domain configuration information in the framework storage allocated to the application domain, the domain configuration information and the domain rule base that are stored being subsequently usable to manage one or more application configurations registered in the application domain.

15. The system of claim 11, wherein:
the rules that are included in the request comprise conditions and corresponding actions that are usable in managing the content services servers; and
the application manager is further configured to:
probe the content services servers to obtain performance or cost metrics for at least one of the one or more cloud-independent methods that is executing in the cloud computing environment;
evaluate one or more rules of a domain rule base for the application domain or the rules included in the request against the obtained performance or cost metrics; and
in response to a determination that one or more conditions specified in the one or more rules is met, take action to scale an application that comprises the application configuration.

16. A computer-readable storage memory storing program instructions that are executable by one or more computers in a cloud computing environment to perform operations comprising:
executing a cloud-independent application manager, that is included as part of a cloud-independent application framework instance in the cloud computing environment which is capable of supporting multiple cloud-independent application framework instances, to perform:
receiving a request to register an application configuration in the framework instance, the request comprising one or more cloud-independent methods included as part of an application configuration object, an identifier of an application domain that is registered to the framework instance, and rules that the application manager is to apply to manage content services servers that are employed by the framework instance to deploy the one or more cloud-independent methods;
storing the rules in framework storage allocated to the application domain and configured to store the application configuration; and
sending the application configuration object to a cloud-independent content services manager of the framework instance, the application configuration object enabling the content services manager to map the one or more cloud-independent methods to the application domain and store a mapping of the one or more cloud-independent methods in the framework storage.

17. The computer readable storage memory of claim 16, wherein the operations further comprise:
  starting one of the content services servers in the cloud computing environment; and
  configuring the content services server to execute at least one of the one or more cloud-independent methods based on contents of the application configuration object.

18. The computer readable storage memory of claim 16, wherein the operations further comprise:
  receiving a request for information from a client indicating one of the content services servers on which a given one of the one or more cloud-independent methods can be invoked; and
  in response to receiving the request for information, sending endpoint information to the client identifying the content services server on which the given one of the one or more cloud-independent methods can be invoked, the endpoint information enabling the given one of the one or more cloud-independent methods to be requested from the identified content services server, the given one of the one or more cloud-independent methods being executable by the identified content services server on behalf of the client by accessing one or more resources of the framework instance, the one or more resources being accessible through a cloud specific service provider interface.

19. The computer readable storage memory of claim 16, wherein the operations further comprise:
  receiving, prior to the request to register the application configuration being received, a request to register the application domain in the framework instance, the request to register the application domain comprising domain configuration information and a domain rule base; and
  in response to receiving the request to register the application domain:
  storing the domain rule base in the framework storage allocated to the application domain;
  launching the content services manager in the framework instance; and
  sending the domain configuration information to the content services manager to enable the content services manager to store the domain configuration information in the framework storage, the domain configuration information and the domain rule base being usable to manage one or more application configurations registered in the application domain.

20. The computer readable storage memory of claim 16, wherein:
  the rules included in the request comprise conditions and corresponding actions that are subsequently usable in managing the content services server; and
  the operations further comprise:
    probing one or more of the content services servers to obtain performance or cost metrics for at least one of the one or more cloud-independent methods;
    evaluating one or more rules of a domain rule base for the application domain or the rules included in the request against the obtained performance or cost metrics; and
    in response to a determination that one or more conditions specified in the one or more rules is met, causing an application to be scaled that comprises the application configuration.

* * * * *